(12) United States Patent  
Song

(10) Patent No.: US 12,508,534 B2  
(45) Date of Patent: Dec. 30, 2025

(54) METHOD FOR MOBILE PRESSURE SWING ADSORPTION OXYGEN PRODUCTION DEVICE

(71) Applicant: CHENGDU YINGCHEN TECHNOLOGY CO., LTD, Sichuan (CN)

(72) Inventor: Yuwen Song, Sichuan (CN)

(73) Assignee: CHENGDU YINGCHEN TECHNOLOGY CO., LTD, Chengdu (CN)

( * ) Notice: Subject to any disclaimer, the term of this patent is extended or adjusted under 35 U.S.C. 154(b) by 600 days.

(21) Appl. No.: 17/925,296

(22) PCT Filed: Apr. 14, 2020

(86) PCT No.: PCT/CN2020/084597  
§ 371 (c)(1),  
(2) Date: Nov. 14, 2022

(87) PCT Pub. No.: WO2021/207909  
PCT Pub. Date: Oct. 21, 2021

(65) Prior Publication Data  
US 2024/0058744 A1    Feb. 22, 2024

(51) Int. Cl.  
*B01D 53/04* (2006.01)  
*B01D 53/047* (2006.01)  
*B01D 53/26* (2006.01)

(52) U.S. Cl.  
CPC ....... *B01D 53/0476* (2013.01); *B01D 53/261* (2013.01); *B01D 2253/104* (2013.01);  
(Continued)

(58) Field of Classification Search  
CPC ............... B01D 53/04; B01D 53/0407; B01D 53/0476; B01D 53/26; B01D 53/261  
See application file for complete search history.

(56) References Cited

U.S. PATENT DOCUMENTS

| 4,640,694 A | 2/1987 | Leitgeb et al. |
| 6,428,607 B1 | 8/2002 | Xu et al. |
| 2007/0227354 A1* | 10/2007 | Song ............... C01B 21/045 95/96 |

FOREIGN PATENT DOCUMENTS

| CN | 1557528 A | 12/2004 |
| CN | 1583222 A | 2/2005 |

(Continued)

OTHER PUBLICATIONS

International Search Report of PCT/CN2020/084597.  
Written Opinion of PCT/CN2020/084597.

*Primary Examiner* — Sharon Pregler

(57) ABSTRACT

The present disclosure provides a method for a mobile pressure swing adsorption oxygen production device, comprising a first PSA section, a second PSA section and a third PSA section which are operated in series; the first PSA section adsorbs oxygen in raw air by a velocity-selective adsorbent; the second PSA section adsorbs nitrogen etc. in desorption gas of the first PSA section by a nitrogen balance-selective adsorbent; the third PSA section removes nitrogen from oxygen-rich gas flowing out of the second PSA section; the first PSA section sequentially undergoes at least adsorption A and vacuumizing VC in one cycle; the second PSA section sequentially undergoes at least adsorption A, pressure-equalizing drop ED, backward discharge BD and pressure-equalizing rise ER; and the third PSA section sequentially undergoes at least adsorption A, pressure-equalizing drop ED, backward discharge BD and pressure-equalizing rise ER.

20 Claims, 21 Drawing Sheets

(52) U.S. Cl.
CPC .. *B01D 2253/116* (2013.01); *B01D 2257/102* (2013.01); *B01D 2257/80* (2013.01); *B01D 2259/403* (2013.01); *B01D 2259/455* (2013.01)

(56) References Cited

FOREIGN PATENT DOCUMENTS

| | | | |
|---|---|---|---|
| CN | 102935324 | A | 2/2013 |
| FR | 2624759 | B1 | 5/1990 |

* cited by examiner first PSA section

| time\tower | 1 | 2 | 3 | 4 | 5 | 6 | 7 | 8 | 9 | 10 | 11 | 12 |
|---|---|---|---|---|---|---|---|---|---|---|---|---|
| A | A | | | | | | VC | | | | | |
| B | VC | | | | | | A | | | | | | a second PSA section

| time\tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | | | | | | ED | | | BD | | | ER | | | A | | |
| B | ER | | | A | | | A | | | | | | ED | | | BD | | |
| C | ED | | | BD | | | ER | | | A | | | A | | | | | | a third PSA section

| time\tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | | | | | | ED | | | BD | | | ER | | | A | | |
| B | ER | | | A | | | A | | | | | | ED | | | BD | | |
| C | ED | | | BD | | | ER | | | A | | | A | | | | | |

FIG. 1 first PSA section

| time\tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | ED | ED | ED | VC | VC | VC | ER | ER | ER | A | A | A |
| B | ER | ER | ER | A | A | A | A | A | A | A | A | A | ED | ED | ED | VC | VC | VC |
| C | ED | ED | ED | VC | VC | VC | ER | ER | ER | A | A | A | A | A | A | A | A | A | a second PSA section

| time\tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | ED | ED | ED | BD | BD | BD | ER | ER | ER | A | A | A |
| B | ER | ER | ER | A | A | A | A | A | A | A | A | A | ED | ED | ED | BD | BD | BD |
| C | ED | ED | ED | BD | BD | BD | ER | ER | ER | A | A | A | A | A | A | A | A | A | a third PSA section

| time\tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | ED | ED | ED | BD | BD | BD | ER | ER | ER | A | A | A |
| B | ER | ER | ER | A | A | A | A | A | A | A | A | A | ED | ED | ED | BD | BD | BD |
| C | ED | ED | ED | BD | BD | BD | ER | ER | ER | A | A | A | A | A | A | A | A | A |

FIG. 3 first PSA section

| time / tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | PP | PP | PP | ED | ED | ED | VC | VC | VC | ER | ER | ER |
| B | VC | VC | VC | ER | ER | ER | A | A | A | A | A | A | PP | PP | PP | ED | ED | ED |
| C | PP | PP | PP | ED | ED | ED | VC | VC | VC | ER | ER | ER | A | A | A | A | A | A | a second PSA section

| time / tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | ED | ED | ED | BD | BD | BD | ER | ER | ER | A | A | A |
| B | ER | ER | ER | A | A | A | A | A | A | A | A | A | ED | ED | ED | BD | BD | BD |
| C | ED | ED | ED | BD | BD | BD | ER | ER | ER | A | A | A | A | A | A | A | A | A | a third PSA section

| time / tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | ED | ED | ED | BD | BD | BD | ER | ER | ER | A | A | A |
| B | ER | ER | ER | A | A | A | A | A | A | A | A | A | ED | ED | ED | BD | BD | BD |
| C | ED | ED | ED | BD | BD | BD | ER | ER | ER | A | A | A | A | A | A | A | A | A |

FIG. 5 first PSA section

| time\tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | PP | PP | PP | PP | PP | PP | VC | VC | VC | VC | VC | VC |
| B | VC | VC | VC | VC | VC | VC | A | A | A | A | A | A | PP | PP | PP | PP | PP | PP |
| C | PP | PP | PP | PP | PP | PP | VC | VC | VC | VC | VC | VC | A | A | A | A | A | A | a second PSA section

| time\tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | ED | ED | ED | BD | BD | BD | ER | ER | ER | A | A | A |
| B | ER | ER | ER | A | A | A | A | A | A | A | A | A | ED | ED | ED | BD | BD | BD |
| C | ED | ED | ED | BD | BD | BD | ER | ER | ER | A | A | A | A | A | A | A | A | A | a third PSA section

| time\tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | ED | ED | ED | BD | BD | BD | ER | ER | ER | A | A | A |
| B | ER | ER | ER | A | A | A | A | A | A | A | A | A | ED | ED | ED | BD | BD | BD |
| C | ED | ED | ED | BD | BD | BD | ER | ER | ER | A | A | A | A | A | A | A | A | A |

FIG. 7 first PSA section

| tower\time | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | ED | ED | ED | VC | VC | VC | ER | ER | ER | A | A | A |
| B | ER | ER | ER | A | A | A | A | A | A | A | A | A | ED | ED | ED | VC | VC | VC |
| C | ED | ED | ED | VC | VC | VC | ER | ER | ER | A | A | A | A | A | A | A | A | A | a second PSA section

| tower\time | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | ED | ED | ED | BD | BD | BD | ER | ER | ER | FR | FR | FR |
| B | ER | ER | ER | A | A | A | A | A | A | A | A | A | ED | ED | ED | BD | BD | BD |
| C | ED | ED | ED | BD | BD | BD | ER | ER | ER | FR | FR | FR | A | A | A | A | A | A | a third PSA section

| tower\time | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | ED | ED | ED | BD | BD | BD | ER | ER | ER | A | A | A |
| B | ER | ER | ER | A | A | A | A | A | A | A | A | A | ED | ED | ED | BD | BD | BD |
| C | ED | ED | ED | BD | BD | BD | ER | ER | ER | A | A | A | A | A | A | A | A | A |

FIG. 9 first PSA section

| time\tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | ED | ED | ED | VC | VC | VC | ER | ER | ER | A | A | A |
| B | ER | ER | ER | A | A | A | A | A | A | A | A | A | ED | ED | ED | VC | VC | VC |
| C | ED | ED | ED | VC | VC | VC | ER | ER | ER | A | A | A | A | A | A | A | A | A | a second PSA section

| time\tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | ED | ED | ED | BD | BD | BD | ER | ER | ER | FR | FR | FR |
| B | ER | ER | ER | A | A | A | A | A | A | A | A | A | ED | ED | ED | BD | BD | BD |
| C | ED | ED | ED | BD | BD | BD | ER | ER | ER | FR | FR | FR | A | A | A | A | A | A | a third PSA section

| time\tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | ED | ED | ED | BD | BD | BD | ER | ER | ER | FR | FR | FR |
| B | ER | ER | ER | A | A | A | A | A | A | A | A | A | ED | ED | ED | BD | BD | BD |
| C | ED | ED | ED | BD | BD | BD | ER | ER | ER | FR | FR | FR | A | A | A | A | A | A |

FIG. 11 first PSA section

| time\tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | ED | ED | ED | VC | VC | VC | ER | ER | ER | A | A | A |
| B | ER | ER | ER | A | A | A | A | A | A | A | A | A | ED | ED | ED | VC | VC | VC |
| C | ED | ED | ED | VC | VC | VC | ER | ER | ER | A | A | A | A | A | A | A | A | A | a second PSA section

| time\tower | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| A | A | A | A | A | A | A | ED | ED | ED | BD | BD | BD | P3 | P3 | P3 | P3 | P3 | P3 | ER | ER | ER | FR | FR | FR |
| B | ER | ER | ER | FR | FR | FR | A | A | A | A | A | A | ED | ED | ED | BD | BD | BD | P3 | P3 | P3 | P3 | P3 | P3 |
| C | P3 | P3 | P3 | P3 | P3 | P3 | ER | ER | ER | FR | FR | FR | A | A | A | A | A | A | ED | ED | ED | BD | BD | BD |
| E | ED | ED | ED | BD | BD | BD | P3 | P3 | P3 | P3 | P3 | P3 | ER | ER | ER | FR | FR | FR | A | A | A | A | A | A | a third PSA section

| time\tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | ED | ED | ED | BD | BD | BD | ER | ER | ER | FR | FR | FR |
| B | ER | ER | ER | A | A | A | A | A | A | A | A | A | ED | ED | ED | BD | BD | BD |
| C | ED | ED | ED | BD | BD | BD | ER | ER | ER | FR | FR | FR | A | A | A | A | A | A |

FIG. 13 first PSA section

| tower\time | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | ED | ED | ED | VC | VC | VC | ER | ER | ER | A | A | A |
| B | ER | ER | ER | A | A | A | A | A | A | A | A | A | ED | ED | ED | VC | VC | VC |
| C | ED | ED | ED | VC | VC | VC | ER | ER | ER | A | A | A | A | A | A | A | A | A | a second PSA section

| tower\time | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| A | A | A | A | A | A | A | ED | ED | ED | BD | BD | BD | P3 | P3 | P3 | R3 | R3 | R3 | ER | ER | ER | FR | FR | FR |
| B | ER | ER | ER | FR | FR | FR | A | A | A | A | A | A | ED | ED | ED | BD | BD | BD | P3 | P3 | P3 | R3 | R3 | R3 |
| C | P3 | P3 | P3 | R3 | R3 | R3 | ER | ER | ER | FR | FR | FR | A | A | A | A | A | A | ED | ED | ED | BD | BD | BD |
| E | ED | ED | ED | BD | BD | BD | P3 | P3 | P3 | R3 | R3 | R3 | ER | ER | ER | FR | FR | FR | A | A | A | A | A | A | a third PSA section

| tower\time | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | A | A | A | A | A | ED | ED | ED | BD | BD | BD | ER | ER | ER | FR | FR | FR |
| B | ER | ER | ER | A | A | A | A | A | A | A | A | A | ED | ED | ED | BD | BD | BD |
| C | ED | ED | ED | BD | BD | BD | ER | ER | ER | FR | FR | FR | A | A | A | A | A | A |

FIG. 15 first PSA section

| Step\Bed | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | | | | | | ED | | VC | | ER | | | A | | | | |
| B | ER | | A | | | | | | A | | | | ED | | | VC | | |
| C | ED | | VC | | ER | | | A | | | | | | A | | | | | a second PSA section

| Step\Bed | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| A | A | | | | | | | | ED | | PP | | BD | | P | | P3 | | R3 | | ER | | | FR | | | | A | | | | |
| B | ER | | | FR | | | | | A | | | | | | | | ED | | PP | | BD | | P | | P3 | | R3 | | | | | |
| C | P | | P3 | | R3 | | ER | | | FR | | | | | | A | | | | | | | | | ED | | PP | | BD | | | P |
| E | ED | | PP | | BD | | P | | P3 | | R3 | | ER | | | FR | | | | | | A | | | | | | | | | | | a third PSA section

| Step\Bed | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | | | | | | ED | | BD | | ER | | | FR | | | | |
| B | ER | | A | | | | | | A | | | | ED | | | BD | | |
| C | ED | | BD | | ER | | | FR | | | | | | A | | | | |

FIG. 17 first PSA section

| time | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | | | | | | ED | | | VC | | | ER | | | A | | |
| B | ER | | | A | | | | | | | | | ED | | | VC | | |
| C | ED | | | VC | | | ER | | | A | | | | | | A | | | a second PSA section

| time | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| A | A | | | | | | ED | | | BD | | | P3 | | | R3 | | | ER | | | FR | | |
| B | ER | | | FR | | | A | | | | | | ED | | | BD | | | P3 | | | R3 | | |
| C | P3 | | | R3 | | | ER | | | FR | | | A | | | | | | ED | | | BD | | |
| E | ED | | | BD | | | P3 | | | R3 | | | ER | | | FR | | | A | | | | | | a third PSA section

| time | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|---|
| A | A | | | | | | | | | | ED | | PP | | BD | | P | | ER | | | | | FR | | | | | | |
| B | ER | | | | FR | | | | | | A | | | | | | | | ED | | PP | | BD | | P | | | | | |
| C | ED | | PP | | BD | | P | | | | ER | | | | FR | | | | | | A | | | | | | | | | |

FIG. 19 first PSA section

| time\tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | | | | | | ED | | VC | | ER | | | A | | | | |
| B | ER | | A | | | | | | | ED | | VC | | | | | | |
| C | ED | | VC | | ER | | A | | | | | | | | | | | | a second PSA section

| time\tower | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| A | A | | | | | | | | | | ED | | PP | | BD | | P | | ER | | | FR | | | | | | | | |
| B | ER | | | FR | | | | | | A | | | | | | | ED | | PP | | BD | | P | | | | | | | |
| C | ED | | PP | | BD | | P | | ER | | | FR | | | | | A | | | | | | | | | | | | | | a third PSA section

| time\tower | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| A | A | | | | | | | | | | ED | | PP | | BD | | P | | ER | | | FR | | | | | | | | |
| B | ER | | | FR | | | | | | A | | | | | | | ED | | PP | | BD | | P | | | | | | | |
| C | ED | | PP | | BD | | P | | ER | | | FR | | | | | A | | | | | | | | | | | | | |

FIG. 21

PSA drying section

| time\tower | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| A | A | | | | | | | | P | | | | | | | |
| B | P | | | | | | | | A | | | | | | | | first PSA section

| time\tower | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| A | A | | | | | | | | | | ED | | PP | | BD | | P | | ER | | | FR | | | | | | | | |
| B | ER | | | FR | | | | | | A | | | | | | | ED | | PP | | BD | | P | | | | | | | |
| C | ED | | PP | | BD | | P | | ER | | | FR | | | | | A | | | | | | | | | | | | | | a second PSA section

| time\tower | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| A | A | | | | | | ED | | VC | | ER | | | A | | | | |
| B | ER | | A | | | | | | | ED | | VC | | | | | | |
| C | ED | | VC | | ER | | A | | | | | | | | | | | | a third PSA section

| time\tower | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 |
|---|---|---|---|---|---|---|---|---|---|---|---|---|---|---|---|---|---|---|---|---|---|---|---|---|---|---|---|---|---|---|
| A | A | | | | | | | | | | ED | | PP | | BD | | P | | ER | | | FR | | | | | | | | |
| B | ER | | | FR | | | | | | A | | | | | | | ED | | PP | | BD | | P | | | | | | | |
| C | ED | | PP | | BD | | P | | ER | | | FR | | | | | A | | | | | | | | | | | | | |

FIG. 22

METHOD FOR MOBILE PRESSURE SWING ADSORPTION OXYGEN PRODUCTION DEVICE

CROSS-REFERENCE TO RELATED APPLICATION

This Application is a national stage application of PCT/CN2020/084597. This application claims priorities from PCT Application No. PCT/CN2020/084597, filed Apr. 14, 2020, the content of which is incorporated herein in the entirety by reference.

TECHNICAL FIELD

The present disclosure relates to the technical field of pressure swing adsorption (PSA), in particular to a method for a mobile PSA oxygen production device.

BACKGROUND ART

At present, as for pure oxygen used in a gas cutting process, the pure oxygen is made by a cryogenic device, then compressed to more than 12.5 MPa by a compressor, charged into a special 40 L steel cylinder, and then transported to various users; however, the use pressure of users is lower than 0.95 MPa, so that a lot of manpower and material resources are consumed, the cost of using oxygen is high, and the safety is poor.

SUMMARY

A purpose of the present disclosure is to provide a novel product of a mobile PSA pure oxygen production device, which has advantages of small volume, light weight, instant on/off, easy operation and low pressure, greatly reduces the cost of using oxygen, and greatly improves the safety of using oxygen. The purpose of the present disclosure is realized by the following technical solution:

A method for a mobile PSA oxygen production device, wherein three-section PSA in series is adopted in the method; firstly, raw air enters a desiccant bed and a velocity-selective adsorbent bed from the bottom of an adsorption tower of a first PSA section; most of gaseous water in the raw air is adsorbed by the desiccant bed; most of oxygen is adsorbed by the velocity-selective adsorbent bed; most of nitrogen and argon are discharged from an outlet of the adsorption tower; the desorption gaseous water and oxygen-enriched gas enter the desiccant bed and the nitrogen balance-selective adsorbent bed from the bottom of an adsorption tower of a second PSA section; most of the gaseous water in the oxygen-enriched gas is adsorbed by the desiccant bed; most of nitrogen is adsorbed by the nitrogen balance-selective adsorbent bed; oxygen, argon and a small amount of nitrogen flow out from an outlet of the adsorption tower, and then enter the nitrogen balance-selective adsorbent bed again from the bottom of an adsorption tower of a third PSA section; most of nitrogen is adsorbed; and oxygen, argon and a small amount of nitrogen flow out from an outlet of the adsorption tower. The adsorption tower of the first PSA section sequentially undergoes at least two PSA steps of adsorption A and vacuumizing VC in one cycle; the adsorption tower of the second PSA section sequentially undergoes at least PSA steps of adsorption A, pressure-equalizing drop ED, backward discharge BD and pressure-equalizing rise ER in one cycle; and the adsorption tower of the third PSA section sequentially undergoes at least PSA steps of adsorption A, pressure-equalizing drop ED, backward discharge BD and pressure-equalizing rise ER in one cycle.

Further, a step of pressure-equalizing drop ED is added to the adsorption tower of the first PSA section after the step of adsorption A; and meanwhile, a PSA step of pressure-equalizing rise ER is added after the step of vacuumizing VC.

Further, a step of pathwise pressure release PP is added to the adsorption tower of the first PSA section after the step of adsorption A.

Further, a PSA step of final pressure rise FR is added to the adsorption tower of the second PSA section after the step of pressure-equalizing rise ER.

Further, a PSA step of final pressure rise FR is added to the adsorption tower of the third PSA section after the step of pressure-equalizing rise ER.

Further, a PSA step of third-section desorption gas purging P3 is added to the adsorption tower of the second PSA section after the step of backward discharge BD.

Further, a PSA step of third-section desorption gas pressure rise R3 is added to the adsorption tower of the second PSA section after the step of third-section desorption gas purging P3.

Further, a step of pathwise pressure release PP is added to the adsorption tower of the second PSA section after the step of pressure-equalizing drop ED; and meanwhile, a step of purging P is added after the step of backward discharge BD.

Further, a step of pathwise pressure release PP is added to the adsorption tower of the third PSA section after the step of pressure-equalizing drop ED; and meanwhile, a step of purging P is added after the step of backward discharge BD.

Further, a PSA step of third-section desorption gas pressure rise R3 is added to the adsorption tower of the second PSA section after the step of purging P.

Further, all or part of the desorption gas in the adsorption tower of the third PSA section is returned to be mixed with the oxygen-enriched desorption gas of the first PSA section.

Further, a PSA step of vacuumizing VC is added to the adsorption tower of the second PSA section after the step of backward discharge BD.

Further, a PSA step of vacuumizing VC is added to the adsorption tower of the third PSA section after the step of backward discharge BD.

Further, the adsorption tower of the first PSA section has a pressure of 0.18-0.22 MPa (gauge pressure) in the step of adsorption A; and the adsorption towers of the second PSA section and the third PSA section have a pressure of 0.9-1.2 MPa (gauge pressure) in the step of adsorption A.

Further, the concentration of oxygen in the outlet gas is 7-12% (V) at the end of the step of adsorption A in the adsorption tower of the first PSA section.

Further, the concentration of oxygen in the outlet gas is 85-96% (V) at the end of the step of adsorption step A in the adsorption tower of the second PSA section.

Further, the adsorption tower of the first PSA section is charged with activated alumina at a lower part, and charged with carbon molecular sieves at an upper part; the adsorption tower of the second PSA section is charged with activated alumina at a lower part, and charged with 5A-type molecular sieves or X-type lithium molecular sieves at an upper part; and the adsorption tower of the third PSA section is charged with 5A-type molecular sieves or X-type lithium molecular sieves.

Further, before the raw air enters the first section, a PSA drying section is added to remove gaseous water from the air, thereby meeting moisture requirements of the adsorption tower of the first PSA section; and meanwhile, the adsorption towers of the first PSA section and the second PSA section are no longer charged with desiccant beds. The PSA drying section sequentially undergoes two PSA steps of adsorption A and purging P in one cycle; and a gas in the step of purging P comes from the evacuated gas during the step of adsorption A from the outlet of the adsorption tower of the first PSA section and the evacuated gas desorbed by the adsorption tower of the second PSA section.

Further, the drying section is charged with activated alumina; the adsorption tower of the first PSA section is charged with carbon molecular sieves; the adsorption tower of the second PSA section is charged with 5A-type molecular sieves or X-type lithium molecular sieves; and the adsorption tower of the third PSA section is charged with 5A-type molecular sieves or X-type lithium molecular sieves.

The present disclosure provides a brand-new product, the mobile PSA pure oxygen production device, which greatly reduces the cost of using oxygen and greatly improves the safety of using oxygen; and the mobile PSA pure oxygen production device has advantages of small size, light weight, instant on/off and convenient use, and has a maximum pressure of only 1.2 MPa.

BRIEF DESCRIPTION OF THE DRAWINGS

FIG. 1 is a diagram showing operation steps of adsorption towers of various PSA sections and switching sequence of program-controlled valves in Example 1 of the present disclosure.

FIG. 3 is a diagram showing operation steps of adsorption towers of various PSA sections and switching sequence of program-controlled valves in Example 2 of the present disclosure.

FIG. 5 is a diagram showing operation steps of adsorption towers of various PSA sections and switching sequence of program-controlled valves in Example 3 of the present disclosure.

FIG. 7 is a diagram showing operation steps of adsorption towers of various PSA sections and switching sequence of program-controlled valves in Example 4 of the present disclosure.

FIG. 9 is a diagram showing operation steps of adsorption towers of various PSA sections and switching sequence of program-controlled valves in Example 5 of the present disclosure.

FIG. 11 is a diagram showing operation steps of adsorption towers of various PSA sections and switching sequence of program-controlled valves in Example 6 of the present disclosure.

FIG. 13 is a diagram showing operation steps of adsorption towers of various PSA sections and switching sequence of program-controlled valves in Example 7 of the present disclosure.

FIG. 15 is a diagram showing operation steps of adsorption towers of various PSA sections and switching sequence of program-controlled valves in Example 8 of the present disclosure.

FIG. 17 is a diagram showing operation steps of adsorption towers of various PSA sections and switching sequence of program-controlled valves in Example 9 of the present disclosure.

FIG. 19 is a diagram showing operation steps of adsorption towers of various PSA sections and switching sequence of program-controlled valves in Example 9 of the present disclosure.

FIG. 21 is a diagram showing operation steps of adsorption towers of various PSA sections and switching sequence of program-controlled valves in Example 11 of the present disclosure.

FIG. 22 is a diagram showing operation steps of adsorption towers of various PSA sections and switching sequence of program-controlled valves in Example 12 of the present disclosure.

DETAILED DESCRIPTION OF THE DISCLOSURE

Examples of the present disclosure will be described below in combination with accompanying drawings; and it should be understood that the following Examples are only preferred Examples for a better understanding on a technical solution of the present disclosure, and are not intended to limit the scope of claims to be protected by the present disclosure.

Example 1

FIG. 1 is a diagram showing operation steps of adsorption towers of various PSA sections and switching sequence of program-controlled valves in Example 1 of the present disclosure.

Figure 2:
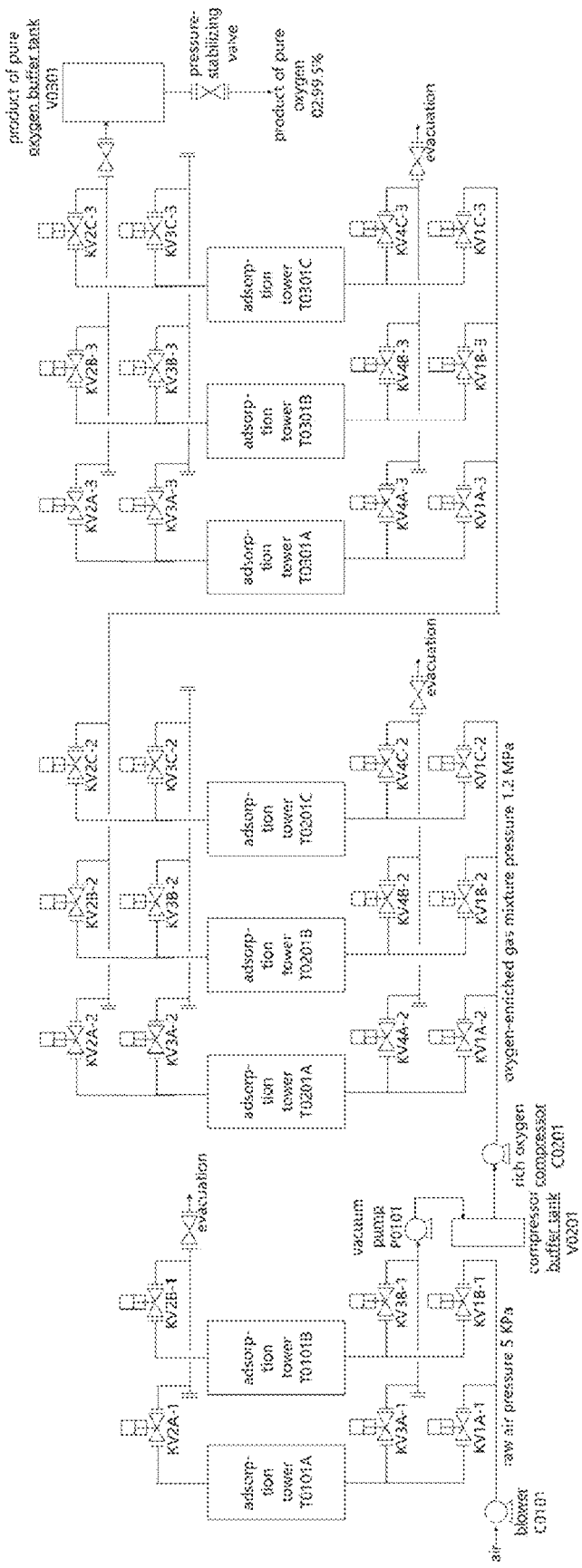
FIG. 2 is a process flow chart of Example 1 of the present disclosure.

FIG. 2 is a process flow chart of Example 1 of the present disclosure.

Composition of raw air in the present Example is as follows:

| Component | $O_2$ | $N_2$ | Ar | $CO_2$ | Others | Σ |
|---|---|---|---|---|---|---|
| Concentration(%)(V) | 20.93 | 78.03 | 0.932 | 0.03 | 0.078 | 100 |

Temperature: ≤40° C.
Pressure: 0.05 MPa (G)

As shown in FIG. 2, a blower C0101, a vacuum pump P0101, program-controlled valves, a PLC control system, instruments, pipe fittings and adsorption towers T0101A and T0101B form the first PSA section; adsorbents charged in the adsorption towers from bottom to top are activated alumina and carbon molecular sieves in turn; in the first PSA section, single tower adsorption and vacuumizing steps are run. A rich oxygen compressor C0201, a compressor buffer tank V0201, program-controlled valves, a PLC control system, instruments, pipe fittings and adsorption towers T0201A, T0201B and T0201C form the second PSA section; adsorbents charged in the adsorption towers from bottom to top are activated alumina, and 5-type molecular sieves or X-type lithium molecular sieves in turn; in the second PSA section, single tower adsorption, pressure equalization and backward discharge steps are run. A product of pure oxygen buffer tank V0301, program-controlled valves, a PLC control system, instruments, pipe fittings, a pressure-stabilizing valve, adsorption towers T0301A, T0301B and T0301C form the third PSA section; adsorbents charged in the adsorption towers are 5-type molecular sieves or X-type lithium molecular sieves; in the third PSA section, single tower adsorption, pressure equalization and backward discharge steps are run. In the present Example, the above three PSA sections are operated in series; the first PSA section adsorbs gaseous water, carbon dioxide and oxygen in the air; the second PSA section adsorbs the gaseous water, carbon dioxide and nitrogen desorbed by the first PSA section, and increases the concentration of oxygen to 85-96% (V); and the third PSA section further adsorbs nitrogen from a gas mixture flowing out from the adsorption tower of the second PSA section during the step of adsorption A and having a concentration of oxygen of 85-96% (V), and increases the concentration of oxygen to above 99.5% (V).

The raw air is boosted to 5 KPa by the blower (C0101) and enters into the adsorption tower of the first PSA section so as to implement adsorption step; the adsorbent in the adsorption tower selectively and sequentially adsorbs gaseous water, carbon dioxide, oxygen etc. in the air; and the unadsorbed oxygen, and less easily adsorbed components such as nitrogen and argon are discharged from an outlet and evacuated. After the adsorption of the adsorption tower of the first PSA section is finished, vacuumizing is carried out immediately; gaseous water, carbon dioxide, oxygen and nitrogen pumped out by the vacuum pump are compressed to 1.2 MPa by the compressor buffer tank (V0201) and the rich oxygen compressor (C0201) and then enter the adsorption tower of the second PSA section so as to implement adsorption step; the adsorbent in the adsorption tower selectively and sequentially adsorbs gaseous water, carbon dioxide and nitrogen in the oxygen-enriched gas mixture; and less easily adsorbed components such as oxygen and argon flow out from the outlet and enter the adsorption tower of the third PSA section so as to implement adsorption step. The adsorbent in the adsorption tower further adsorbs the nitrogen in the oxygen-enriched gas mixture; and less easily adsorbed components such as oxygen and argon flow out from the outlet and enter the product of pure oxygen buffer tank (V0301). After the adsorption of the adsorption tower of the first PSA section is finished, the concentration of oxygen in the gas flowing out from the outlet is controlled at 15-20.8% (V); and the adsorption tower of the first PSA section undergoes two PSA steps of adsorption A and vacuumizing VC in one cycle. The concentration of oxygen in the outlet gas of the adsorption tower of the second PSA section during the step of adsorption is controlled at about 85-96% (V); and the adsorption tower sequentially undergoes the PSA steps of adsorption A, pressure-equalizing drop ED, backward discharge BD and pressure-equalizing rise ER in one cycle. The concentration of oxygen in the outlet gas of the adsorption tower of the third PSA section during the adsorption step is controlled above 99.5% (V); and the adsorption tower sequentially undergoes the PSA steps of adsorption A, pressure-equalizing drop ED, backward discharge BD and pressure-equalizing rise ER in one cycle. A total recovery rate of oxygen is about 60%; the concentration of oxygen in the first-section vacuum desorption gas is about 80%; the circulation time of the adsorption tower of each PSA section is generally 20-80 seconds; the vacuum degree of the first section is −0.095 MPa; and the air volume of the blower, the superficial gas velocity of the adsorption towers of each PSA sections, the pumping volume of the vacuum pump, the amount of used adsorbent, the diameter of the adsorption tower and other design parameters are designed according to general conditions in the technical field of PSA.

Each adsorption tower in the present disclosure sequentially undergoes the following steps in one cycle.

Adsorption tower of the first PSA section:

(1) Adsorption A

After raw air is boosted to 5 KPa by the blower (C0101), a program-controlled valve KV1A-1 is opened, so that the air enters into an adsorption tower T0101A to rise the pressure; when an adsorption pressure is reached, a program-controlled valve KV2A-1 is opened; an adsorbent in the adsorption tower selectively and sequentially adsorbs gaseous water, carbon dioxide, oxygen etc. in the air; the unadsorbed oxygen, and less easily adsorbed components such as nitrogen and argon are discharged from an outlet and evacuated by opening the program-controlled valve KV2A-1; with the passage of time, the total amount of gaseous water, carbon dioxide, oxygen etc. adsorbed by the adsorbent is continuously increasing; and when the concentration of oxygen at an outlet of the adsorption tower T0101A is greater than 20% (V), the air intake is stopped, and the adsorption is finished.

(2) Vacuumizing VC

After the adsorption of the adsorption tower T0101A is finished, a program-controlled valve KV3A-1 is opened to pump out the gaseous water, carbon dioxide, oxygen and nitrogen absorbed by the adsorbent from the bottom of the adsorption tower with a vacuum pump, for entering into a compressor buffer tank (V0201), so that the adsorbent is regenerated, and an oxygen-enriched intermediate gas is obtained at the same time.

After the above steps, the adsorption tower T0101A completes one cycle and prepares for the raw gas adsorption step again; and the operation of other adsorption towers in the first PSA section are exactly the same as that of the adsorption tower T0101A, except that they are staggered operation.

Second PSA Section (1) Adsorption A

Program-controlled valves KV1A-2 and KV2A-2 of the second PSA section are opened at the same time; the oxygen-enriched gas mixture pumped out in the step of vacuumizing (VC) of the adsorption tower of the first PSA section is fed into the compressor buffer tank (V0201), is compressed to 1.2 MPa by a rich oxygen compressor (C0201), and then enters into an adsorbent bed of an adsorption tower T0201A from the bottom to rise the pressure; meanwhile, the outlet gas of the adsorption tower of the second PSA section boosts the adsorption tower T0201A from the top through the program-controlled valve KV2A-2; when an adsorption pressure is reached, an adsorbent in the adsorption tower T0201A selectively and sequentially adsorbs gaseous water, carbon dioxide, nitrogen etc. in the oxygen-enriched gas mixture; the unadsorbed nitrogen, and less easily adsorbed components such as oxygen and argon flow out from the outlet and enters into the adsorption tower of the third PSA section for the step of adsorption by opening the program-controlled valve KV2A-2; with the passage of time, the total amount of gaseous water, carbon dioxide, nitrogen etc. adsorbed by the adsorbent is continuously increasing; and when the nitrogen adsorbed by the adsorption tower T0201A is saturated, the air intake is stopped, and the adsorption is finished.

(2) Pressure-Equalizing Drop ED

After the adsorption is finished, program-controlled valves KV3A-2 and KV3C-2 are opened; and a dead space gas in the adsorption tower T0201A will be discharged from the outlet of the adsorption tower and enter into the adsorption tower T0201C, which has completed the step of backward discharge BD in second PSA section, to rise the pressure, so that the two towers have the same pressure as much as possible.

(3) Backward Discharge BD

After the pressure-equalizing drop ED of the adsorption tower T0201A is finished, a program-controlled valve KV4A-2 is opened to evacuate the gas in the adsorption tower T0201A backwards until the pressure is close to a normal pressure.

(4) Pressure-Equalizing Rise ER

After the backward discharge BD of the adsorption tower T0201A is finished, program-controlled valves KV3A-2 and KV3B-2 are opened; a gas discharged in the step of pressure-equalizing drop ED of the adsorption tower T0201B enters into the adsorption tower from the outlet of the adsorption tower T0201A, to rise the pressure of the adsorption tower T0201A, so that the adsorption towers T0201A and T0201B have the same pressure as much as possible.

After the above steps, the adsorption tower T0201A completes one cycle and prepares for the step of adsorption again; and the operation of other adsorption towers in second PSA section are exactly the same as that of the adsorption tower T0201A, except that they are staggered operation.

Third PSA Section (1) Adsorption A

Program-controlled valves KV1A-3 and KV2A-3 of the third PSA section are opened at the same time; the oxygen-enriched gas mixture flowing out from the adsorption tower of the second PSA section after the step of adsorption A enters an adsorbent bed of the adsorption tower T0301A to rise the pressure; meanwhile, the outlet gas of the adsorption tower of the third PSA section boosts the adsorption tower T0301A from the top through a program-controlled valve KV2A-3; when an adsorption pressure is reached, an adsorbent in the adsorption tower T0301A selectively adsorbs nitrogen in the oxygen-enriched gas mixture; the less easily adsorbed components such as oxygen and argon flow out from the outlet and enter into a product of pure oxygen buffer tank (V0301) by opening the program-controlled valve KV2A-3, and then are sent to be used (e.g., air cutting) after passing through a pressure-stabilizing valve; with the passage of time, the total amount of nitrogen adsorbed by the adsorbent is continuously increasing; and when the nitrogen adsorbed by the adsorption tower T0301A is saturated, the air intake is stopped, and the adsorption is finished.

(2) Pressure-Equalizing Drop ED

After the adsorption is finished, program-controlled valves KV3A-3 and KV3C-3 are opened; and a dead space gas in the adsorption tower T0301A will be discharged from the outlet of the adsorption tower and enter into the adsorption tower T0301C, which has completed the step of backward discharge BD in this section, to rise the pressure, so that the two towers have the same pressure as much as possible.

(3) Backward Discharge BD

After the pressure-equalizing drop ED of the adsorption tower T0301A is finished, a program-controlled valve KV4A-3 is opened to evacuate the gas in the adsorption tower T0301A backwards until the pressure is close to a normal pressure.

(4) Pressure-Equalizing Rise ER

After the backward discharge BD of the adsorption tower T0301A is finished, program-controlled valves KV3A-3 and KV3B-3 are opened; a gas discharged in the step of pressure-equalizing drop ED of the adsorption tower T0301B enters the adsorption tower from the outlet of the adsorption tower T0301A, to rise the pressure of the adsorption tower T0301A, so that the adsorption towers T0301A and T0301B have the same pressure as much as possible.

After the above steps, the adsorption tower T0301A completes one cycle and prepares for the raw gas adsorption step again; and the operation of other adsorption towers in third PSA section are exactly the same as that of the adsorption tower T0301A, except that they are staggered operation.

The pressure of the discharged gas compressed by the rich oxygen compressor (C0201) can also be lower than 1.2 MPa, and is mainly determined according to use requirements.

Results of the present Example show that the concentration of oxygen in the product is greater than or equal to 99.5% (V), the pressure is greater than or equal to 1.0 MPa, and the cost of using oxygen is 30% lower than that of bottled oxygen.

Example 2

Figure 4:
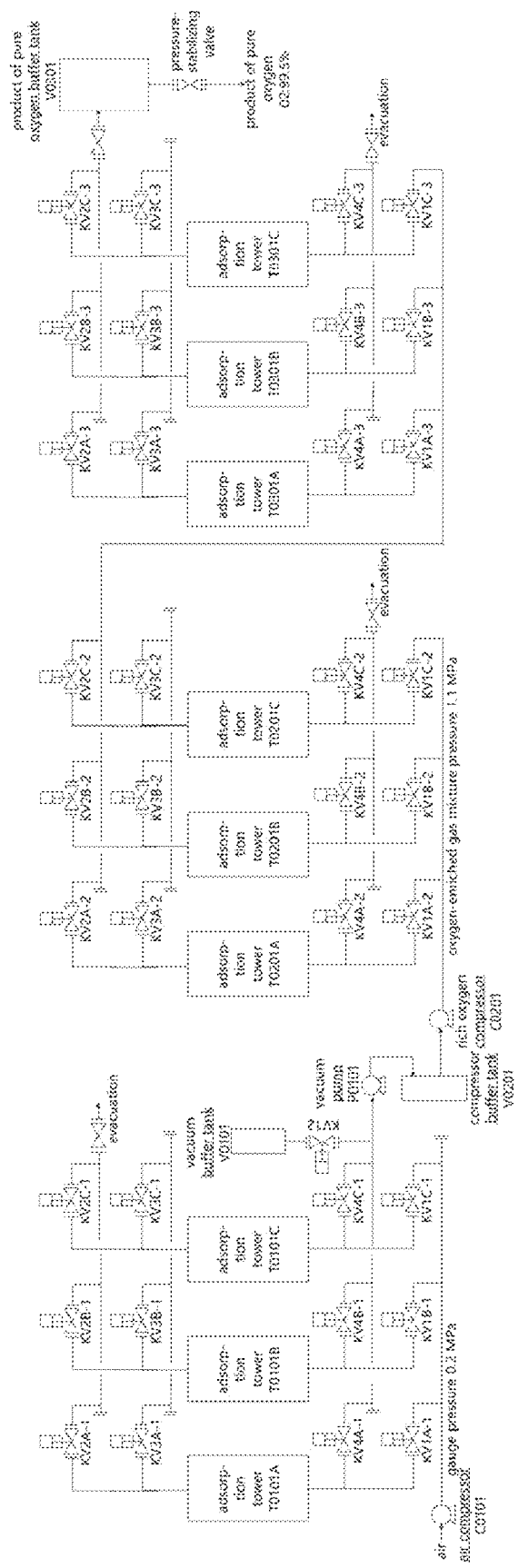
FIG. 4 is a process flow chart of Examples 2, 5 and 6 of the present disclosure.

FIG. 3 is a diagram showing operation steps of adsorption towers of various PSA sections and switching sequence of program-controlled valves in Example 2 of the present disclosure. FIG. 4 is a process flow chart of Example 2 of the present disclosure.

Composition of raw air in the present Example is as follows:

| Component | $O_2$ | $N_2$ | Ar | $CO_2$ | Others | Σ |
|---|---|---|---|---|---|---|
| Concentration(%)(V) | 20.93 | 78.03 | 0.932 | 0.03 | 0.078 | 100 |

Temperature: ≤40° C.
Pressure: 0.2 MPa (G)

As shown in FIG. 4, an air compressor C0101, a vacuum buffer tank V0101, a vacuum pump P0101, program-controlled valves, a PLC control system, instruments, pipe fittings and adsorption towers T0101A, T0101B and T0101C form the first PSA section; adsorbents charged in the adsorption towers from bottom to top are activated alumina and carbon molecular sieves in turn; in the first PSA section, single tower adsorption, pressure equalization and vacuumizing steps are run. A rich oxygen compressor C0201, a compressor buffer tank V0201, program-controlled valves, a PLC control system, instruments, pipe fittings and adsorption towers T0201A, T0201B and T0201C form the second PSA section; adsorbents charged in the adsorption towers from bottom to top are activated alumina, and 5-type molecular sieves or X-type lithium molecular sieves in turn; in the second PSA section, single tower adsorption, pressure equalization and backward discharge steps are run. A product of pure oxygen buffer tank V0301, program-controlled valves, a PLC control system, instruments, pipe fittings, a pressure-stabilizing valve, adsorption towers T0301A, T0301B and T0301C form the third PSA section; adsorbents charged in the adsorption towers are 5-type molecular sieves or X-type lithium molecular sieves; in the third PSA section, single tower adsorption, pressure equalization and backward discharge steps are run. In the present Example, the above three PSA sections are operated in series; the first PSA section adsorbs gaseous water, carbon dioxide and oxygen in the air; the second PSA section is used for adsorbing the gaseous water, carbon dioxide and nitrogen desorbed by the first PSA section, and increasing the concentration of oxygen to about 85-96% (V); and the third PSA section is used for adsorbing nitrogen from a gas mixture flowing out from the adsorption tower of the second PSA section after the step of adsorption A and having a concentration of oxygen of 85-96% (V), and increasing the concentration of oxygen to above 99.5% (V).

The raw air is boosted to 0.2 MPa (G) by the air compressor (C0101) and enters into the adsorption tower of the first PSA section so as to implement the step of adsorption; the adsorbent in the adsorption tower selectively and sequentially adsorbs gaseous water, carbon dioxide, oxygen etc. in the air; and the unadsorbed oxygen, and less easily adsorbed components such as nitrogen and argon are discharged from an outlet and evacuated. After the adsorption of the adsorption tower of the first PSA section is finished, vacuumizing is carried out after pressure equalization; gaseous water, carbon dioxide, oxygen and nitrogen pumped out by the vacuum pump are compressed to 1.2 MPa by the compressor buffer tank (V0201) and the rich oxygen compressor (C0201) and then enter into the adsorption tower of the second PSA section so as to implement the step of adsorption; the adsorbent in the adsorption tower selectively and sequentially adsorbs gaseous water, carbon dioxide and nitrogen in the oxygen-enriched gas mixture; and less easily adsorbed components such as oxygen and argon flow out from the outlet and enter into the adsorption tower of the third PSA section so as to implement the step of adsorption. The adsorbent in the adsorption tower further adsorbs the nitrogen in the oxygen-enriched gas mixture; and less easily adsorbed components such as oxygen and argon flow out from the outlet and enter into the product of pure oxygen buffer tank (V0301). After the adsorption of the adsorption tower of the first PSA section is finished, the concentration of oxygen in the outlet gas is controlled at 7-12% (V); and the adsorption tower of the first PSA section sequentially undergoes PSA steps of adsorption A, pressure-equalizing drop ED, vacuumizing VC and pressure-equalizing rise ER in one cycle. The concentration of oxygen in the outlet gas of the adsorption tower of the second PSA section in the step of adsorption is controlled at about 85-96% (V); and the adsorption tower sequentially undergoes the PSA steps of adsorption A, pressure-equalizing drop ED, backward discharge BD and pressure-equalizing rise ER in one cycle. The concentration of oxygen in the outlet gas of the adsorption tower of the third PSA section in the adsorption step is controlled above 99.5% (V); and the adsorption tower sequentially undergoes the PSA steps of adsorption A, pressure-equalizing drop ED, backward discharge BD and pressure-equalizing rise ER in one cycle. A total recovery rate of oxygen is about 85%; the concentration of oxygen in the vacuum desorption gas of the first section is about 80%; the circulation time of the adsorption tower of each PSA section is generally 20-80 seconds; the vacuum degree of the first section is −0.095 MPa; and the air volume of the compressor, the superficial velocity of the adsorption towers of each PSA section, the pumping volume of the vacuum pump, the amount of used adsorbent, the diameter of the adsorption tower and other design parameters are designed according to general conditions in the technical field of PSA.

Each adsorption tower in the present disclosure sequentially undergoes the following steps in one cycle.

Adsorption tower of the first PSA section:

(1) Adsorption A

After raw air is boosted to 0.2 MPa (G) by the air compressor (C0101), a program-controlled valve KV1A-1 is opened, so that the air enters into an adsorption tower T0101A to rise the pressure; when an adsorption pressure is reached, a program-controlled valve KV2A-1 is opened; an adsorbent in the adsorption tower selectively and sequentially adsorbs gaseous water, carbon dioxide, oxygen etc. in the air; the unadsorbed oxygen, and less easily adsorbed components such as nitrogen and argon are discharged from an outlet and evacuated by opening the program-controlled valve KV2A-1; with the passage of time, the total amount of gaseous water, carbon dioxide, oxygen etc. adsorbed by the adsorbent is continuously increasing; and when the concentration of oxygen at an outlet of the adsorption tower T0101A is between 7-12% (V), the air intake is stopped, and the adsorption is finished.

(2) Pressure-Equalizing Drop ED

After the adsorption is finished, program-controlled valves KV3A-1 and KV3C-1 are opened; and a dead space gas in the adsorption tower T0101A will be discharged from the outlet of the adsorption tower and enter into the adsorption tower T0101C, which has completed the step of backward discharge BD in the first PSA section, to rise the pressure, so that the two towers have the same pressure as much as possible.

(3) Vacuumizing VC

After the pressure-equalizing drop ED of the adsorption tower T0101A is finished, a program-controlled valve KV4A-1 is opened and the gaseous water, carbon dioxide, oxygen and nitrogen absorbed by the adsorbent are pumped out from the bottom of the adsorption tower with a vacuum pump, and enter into a compressor buffer tank (V0201), so that the adsorbent is regenerated, and an oxygen-enriched intermediate gas is obtained at the same time. When the adsorption tower is not vacuumized, a program-controlled valve KV12 is opened and the vacuum pump is communicated with a vacuum buffer tank V0101.

(4) Pressure-Equalizing Rise ER

After the vacuumizing VC of the adsorption tower T0101A is finished, program-controlled valves KV3A-1 and KV3B-1 are opened; a gas discharged in the step of pressure-equalizing drop ED of an adsorption tower T0101B enters into the adsorption tower from the outlet of the adsorption tower T0101A, to rise the pressure of the adsorption tower T0101A, so that the adsorption towers T0101A and T0101B have the same pressure as much as possible.

After the above steps, the adsorption tower T0101A completes one cycle and is prepared for the raw gas adsorption again; and the operation of other adsorption towers in the first PSA section are exactly the same as that of the adsorption tower T0101A, except that they are staggered operation.

The adsorption towers of the second PSA section and the third PSA section sequentially undergo the same steps and switching sequence of program-controlled valves in one cycle as those of the second PSA section and the third PSA section in Example 1.

Results of the present Example show that the concentration of oxygen in the product is greater than or equal to 99.5% (V), the pressure is greater than or equal to 1.0 MPa, and the cost of using oxygen is 35% lower than that of bottled oxygen.

Example 3

Figure 6:
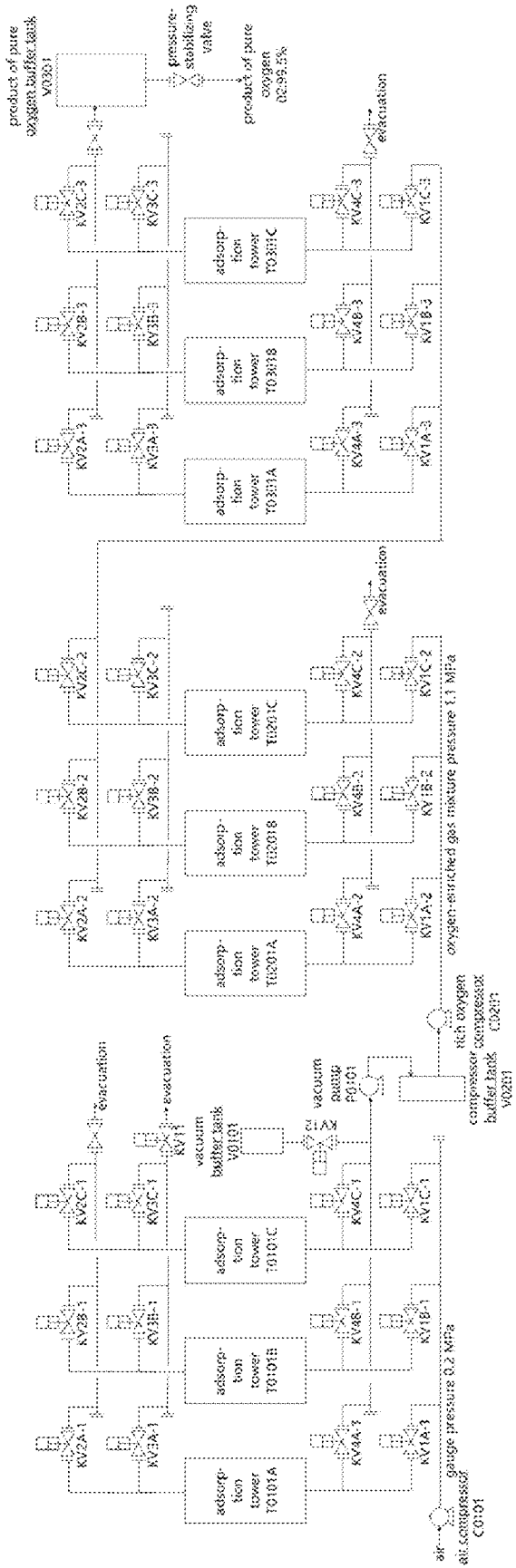
FIG. 6 is a process flow chart of Example 3 of the present disclosure.

FIG. 5 is a diagram showing operation steps of adsorption towers of various PSA sections and switching sequence of program-controlled valves in Example 3 of the present disclosure. FIG. 6 is a process flow chart of Example 3 of the present disclosure.

Composition of raw air in the present Example is as follows:

| Component | $O_2$ | $N_2$ | Ar | $CO_2$ | Others | Σ |
|---|---|---|---|---|---|---|
| Concentration(%)(V) | 20.93 | 78.03 | 0.932 | 0.03 | 0.078 | 100 |

Temperature: ≤40° C.
Pressure: 0.2 MPa (G)

As shown in FIG. 6, an air compressor C0101, a vacuum buffer tank V0101, a vacuum pump P0101, program-controlled valves, a PLC control system, instruments, pipe fittings and adsorption towers T0101A, T0101B and T0101C form the first PSA section; adsorbents charged in the adsorption towers from bottom to top are activated alumina and carbon molecular sieves in turn; in the first PSA section, single tower adsorption, pathwise pressure release, pressure equalization and vacuumizing steps are run. A rich oxygen compressor C0201, a compressor buffer tank V0201, program-controlled valves, a PLC control system, instruments, pipe fittings and adsorption towers T0201A, T0201B and T0201C form the second PSA section; adsorbents charged in the adsorption towers from bottom to top are activated alumina, and 5-type molecular sieves or X-type lithium molecular sieves in turn; in the second PSA section, single tower adsorption, pressure equalization and backward discharge steps are run. A product of pure oxygen buffer tank V0301, program-controlled valves, a PLC control system, instruments, pipe fittings, a pressure-stabilizing valve, adsorption towers T0301A, T0301B and T0301C form the third PSA section; adsorbents charged in the adsorption towers are 5-type molecular sieves or X-type lithium molecular sieves; in the third PSA section, single tower adsorption, pressure equalization and backward discharge steps are run. In the present Example, the above three PSA sections are operated in series; the first PSA section adsorbs gaseous water, carbon dioxide and oxygen in the air; the second PSA section is used for adsorbing the gaseous water, carbon dioxide and nitrogen desorbed by the first PSA section, and increasing the concentration of oxygen to 85-96% (V); and the third PSA section is used for adsorbing nitrogen flowing out the adsorption tower of the second PSA section in the step of adsorption A and having a concentration of oxygen of 85-96% (V), and increasing the concentration of oxygen to above 99.5% (V).

The raw air is boosted to 0.2 MPa (G) by the air compressor (C0101) and enters into the adsorption tower of the first PSA section so as to implement the step of adsorption; the adsorbent in the adsorption tower selectively and sequentially adsorbs gaseous water, carbon dioxide, oxygen etc. in the air; and the unadsorbed oxygen, and less easily adsorbed components such as nitrogen and argon are discharged from an outlet and evacuated. After the adsorption of the adsorption tower of the first PSA section is finished, pressure equalization and vacuumizing are carried out after pathwise pressure release; gaseous water, carbon dioxide, oxygen and nitrogen pumped out by the vacuum pump are compressed to 1.2 MPa by the compressor buffer tank (V0201) and the rich oxygen compressor (C0201) and then enter into the adsorption tower of the second PSA section so as to implement the step of adsorption; the adsorbent in the adsorption tower selectively and sequentially adsorbs gaseous water, carbon dioxide and nitrogen in the oxygen-enriched gas mixture; and less easily adsorbed components such as oxygen and argon flow out from the outlet and enter into the adsorption tower of the third PSA section so as to implement the step of adsorption. The adsorbent in the adsorption tower further adsorbs the nitrogen in the oxygen-enriched gas mixture; and less easily adsorbed components such as oxygen and argon flow out from the outlet and enter into the product of pure oxygen buffer tank (V0301). After the adsorption of the adsorption tower of the first PSA section is finished, the concentration of oxygen in the outlet gas is controlled at 7-12% (V); and the adsorption tower of the first PSA section sequentially undergoes PSA steps of adsorption A, pathwise pressure release PP, pressure-equalizing drop ED, vacuumizing VC and pressure-equalizing rise ER in one cycle. The concentration of oxygen in the outlet gas of the adsorption tower of the second PSA section in the step of adsorption is controlled at about 85-96% (V); and the adsorption tower sequentially undergoes the PSA steps of adsorption A, pressure-equalizing drop ED, backward discharge BD and pressure-equalizing rise ER in one cycle. The concentration of oxygen in the outlet gas of the adsorption tower of the third PSA section in the adsorption step is controlled above 99.5% (V); and the adsorption tower sequentially undergoes the PSA steps of adsorption A, pressure-equalizing drop ED, backward discharge BD and pressure-equalizing rise ER in one cycle. A total recovery rate of oxygen is about 85%; the concentration of oxygen in the vacuum desorption gas of the first section is about 80%; the circulation time of the adsorption tower of each PSA section is generally 20-80 seconds; the vacuum degree of the first section is −0.095 MPa; and the air volume of the compressor, the superficial velocity of the adsorption towers of each PSA section, the pumping volume of the vacuum pump, the amount of used adsorbent, the diameter of the adsorption tower and other design parameters are designed according to general conditions in the technical field of PSA. Each adsorption tower in the present disclosure sequentially undergoes the following steps in one cycle.

Adsorption Tower of the First PSA Section:

(1) Adsorption A

After raw air is boosted to 0.2 MPa (G) by the air compressor (C0101), a program-controlled valve KV1A-1 is opened, so that the air enters into an adsorption tower T0101A to rise the pressure; when an adsorption pressure is reached, a program-controlled valve KV2A-1 is opened; an adsorbent in the adsorption tower selectively and sequentially adsorbs gaseous water, carbon dioxide, oxygen etc. in the air; the unadsorbed oxygen, and less easily adsorbed components such as nitrogen and argon are discharged from an outlet and evacuated by opening the program-controlled valve KV2A-1; with the passage of time, the total amount of gaseous water, carbon dioxide, oxygen etc. adsorbed by the adsorbent is continuously increasing; and when the concentration of oxygen at an outlet of the adsorption tower T0101A is about 7-12% (V), the air intake is stopped, and the adsorption is finished.

(2) Pathwise Pressure Release PP

After the adsorption is finished, program-controlled valves KV3A-1 and KV11 are opened; a dead space gas in the adsorption tower T0101A will be discharged from an outlet of the adsorption tower and evacuated; and when the pressure drops to 0.08-0.12 MPa (G), the program-controlled valve KV11 is closed, and the pathwise pressure release PP is finished.

(3) Pressure-Equalizing Drop ED

After the pathwise pressure release is finished, the program-controlled valve KV3C-1 is opened; and the dead space gas in the adsorption tower T0101A will be discharged from the outlet of the adsorption tower and enter into the adsorption tower T0101C, which has completed the step of backward discharge BD in this PSA section, to rise the pressure, so that the two towers have the same pressure as much as possible.

(4) Vacuumizing VC

After the pressure-equalizing drop ED of the adsorption tower T0101A is finished, a program-controlled valve KV4A-1 is opened, and the gaseous water, carbon dioxide, oxygen and nitrogen absorbed by the adsorbent are pumped out from the bottom of the adsorption tower with a vacuum pump, and enter into a compressor buffer tank (V0201), so that the adsorbent is regenerated, and an oxygen-enriched intermediate gas is obtained at the same time. When adsorption tower is not vacuumized, a program-controlled valve KV12 is opened and the vacuum pump is communicated with a vacuum buffer tank V0101.

(5) Pressure-Equalizing Rise ER

After the vacuumizing VC of the adsorption tower T0101A is finished, program-controlled valves KV3A-1 and KV3B-1 are opened; a gas discharged in the step of pressure-equalizing drop ED of an adsorption tower T0101B enters into the adsorption tower from the outlet of the adsorption tower T0101A, to rise the pressure of the adsorption tower T0101A, so that the adsorption towers T0101A and T0101B have the same pressure as much as possible.

After the above steps, the adsorption tower T0101A completes one cycle and is prepared for the raw gas adsorption again; and the operation of other adsorption towers in the first PSA section are exactly the same as that of the adsorption tower T0101A, except that they are staggered operation.

The adsorption towers of the second PSA section and the third PSA section sequentially undergo the same steps and switching sequence of program-controlled valves in one cycle as those of the second PSA section and the third PSA section in Example 1.

Results of the present Example show that the concentration of oxygen in the product is greater than or equal to 99.5% (V), the pressure is greater than or equal to 1.0 MPa, and the cost of using oxygen is 40% lower than that of bottled oxygen.

Example 4

Figure 8:
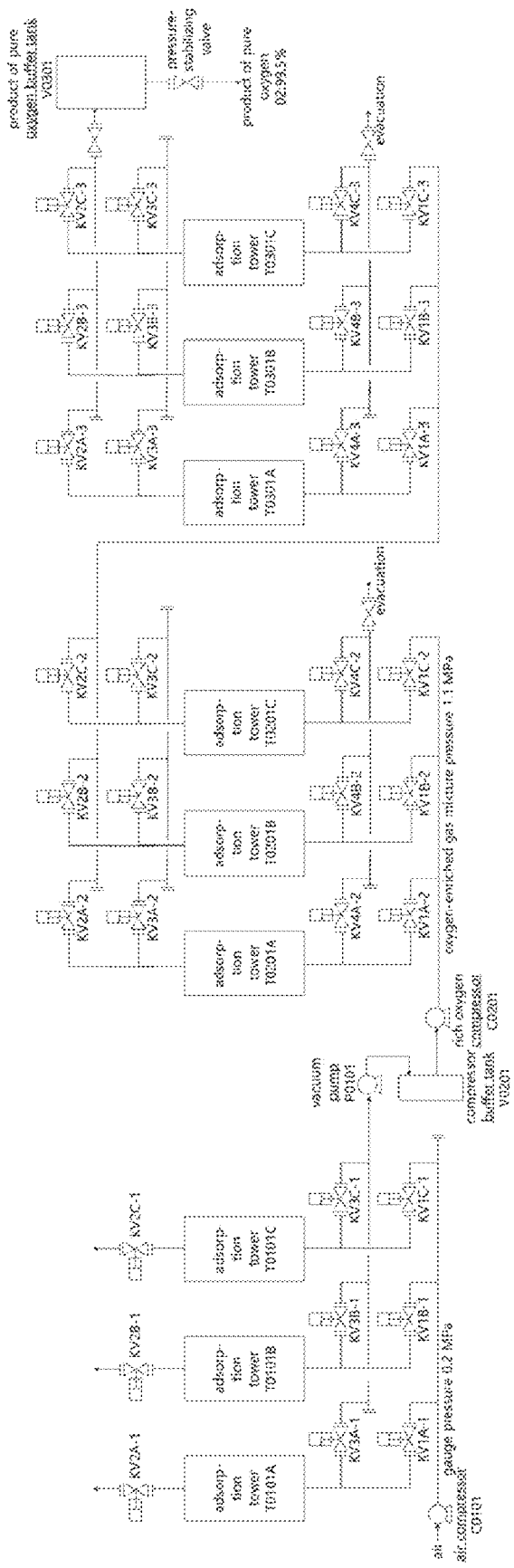
FIG. 8 is a process flow chart of Example 4 of the present disclosure.

FIG. 7 is a diagram showing operation steps of adsorption towers of various sections and switching sequence of program-controlled valves in Example 4 of the present disclosure. FIG. 8 is a process flow chart of Example 4 of the present disclosure.

Composition of raw air in the present Example is as follows:

| Component | $O_2$ | $N_2$ | Ar | $CO_2$ | Others | Σ |
|---|---|---|---|---|---|---|
| Concentration(%)(V) | 20.93 | 78.03 | 0.932 | 0.03 | 0.078 | 100 |

Temperature: ≤40° C.
Pressure: 0.2 MPa (G)

As shown in FIG. 8, an air compressor C0101, a vacuum pump P0101, program-controlled valves, a PLC control system, instruments, pipe fittings and adsorption towers T0101A, T0101B and T0101C form the first PSA section; adsorbents charged in the adsorption towers from bottom to top are activated alumina and carbon molecular sieves in turn; in the first PSA section, single tower adsorption, pathwise pressure release and vacuumizing steps are run. A rich oxygen compressor C0201, a compressor buffer tank V0201, program-controlled valves, a PLC control system, instruments, pipe fittings and adsorption towers T0201A, T0201B and T0201C form the second PSA section; adsorbents charged in the adsorption towers from bottom to top are activated alumina, and 5-type molecular sieves or X-type lithium molecular sieves in turn; in the second PSA section, single tower adsorption, pressure equalization and backward discharge steps are run. A product of pure oxygen buffer tank V0301, program-controlled valves, a PLC control system, instruments, pipe fittings, a pressure-stabilizing valve, adsorption towers T0301A, T0301B and T0301C form the third PSA section; adsorbents charged in the adsorption towers are 5-type molecular sieves or X-type lithium molecular sieves; in the third PSA section, single tower adsorption, pressure equalization and backward discharge steps are run. In the present Example, the above three PSA sections are operated in series; the first PSA section adsorbs gaseous water, carbon dioxide and oxygen in the air; the second PSA section is used for adsorbing the gaseous water, carbon dioxide and nitrogen desorbed by the first PSA section, and increasing the concentration of oxygen to about 85-96% (V); and the third PSA section is used for adsorbing nitrogen from a gas mixture flowing out from the adsorption tower of the second PSA section in the step of adsorption A and having a concentration of oxygen of 85-96% (V), and increasing the concentration of oxygen to above 99.5% (V).

The raw air is boosted to 0.2 MPa (G) by the air compressor (C0101) and enters into the adsorption tower of the first PSA section so as to implement the step of adsorption; the adsorbent in the adsorption tower selectively and sequentially adsorbs gaseous water, carbon dioxide, oxygen etc. in the air; and the unadsorbed oxygen, and less easily adsorbed components such as nitrogen and argon are discharged from an outlet and evacuated. After the adsorption of the adsorption tower of the first PSA section is finished, vacuumizing is carried out after pathwise pressure release; gaseous water, carbon dioxide, oxygen and nitrogen pumped out by the vacuum pump are compressed to 1.2 MPa by the compressor buffer tank (V0201) and the rich oxygen compressor (C0201) and then enter into the adsorption tower of the second PSA section so as to implement the step of adsorption; the adsorbent in the adsorption tower selectively and sequentially adsorbs gaseous water, carbon dioxide and nitrogen in the oxygen-enriched gas mixture; and less easily adsorbed components such as oxygen and argon flow out from the outlet and enter into the adsorption tower of the third PSA section so as to implement the step of adsorption. The adsorbent in the adsorption tower further adsorbs the nitrogen in the oxygen-enriched gas mixture; and less easily adsorbed components such as oxygen and argon flow out from the outlet and enter into the product of pure oxygen buffer tank (V0301). After the adsorption of the adsorption tower of the first PSA section is finished, the concentration of oxygen in the outlet gas is controlled at 7-12% (V); and the adsorption tower of the first PSA section sequentially undergoes PSA steps of adsorption A, pathwise pressure release PP and vacuumizing VC in one cycle. The concentration of oxygen in the outlet gas of the adsorption tower of the second PSA section in the step of adsorption is controlled at about 85-96% (V); and the adsorption tower sequentially undergoes the PSA steps of adsorption A, pressure-equalizing drop ED, backward discharge BD and pressure-equalizing rise ER in one cycle. The concentration of oxygen in the outlet gas of the adsorption tower of the third PSA section in the adsorption step is controlled above 99.5% (V); and the adsorption tower sequentially undergoes the PSA steps of adsorption A, pressure-equalizing drop ED, backward discharge BD and pressure-equalizing rise ER in one cycle. A total recovery rate of oxygen is about 85%; the concentration of oxygen in the vacuum desorption gas of the first section is about 80%; the circulation time of the adsorption tower of each PSA section is generally 20-80 seconds; the vacuum degree of the first section is −0.095 MPa; and the air volume of the compressor, the superficial velocity of the adsorption towers of each PSA section, the pumping volume of the vacuum pump, the amount of used adsorbent, the diameter of the adsorption tower and other design parameters are designed according to general conditions in the technical field of PSA. Each adsorption tower in the present disclosure sequentially undergoes the following steps in one cycle.

Adsorption Tower of the First PSA Section:

(1) Adsorption A

After raw air is boosted to 0.2 MPa (G) by the air compressor (C0101), a program-controlled valve KV1A-1 is opened, so that the air enters into an adsorption tower T0101A to rise the pressure; when an adsorption pressure is reached, a program-controlled valve KV2A-1 is opened; an adsorbent in the adsorption tower selectively and sequentially adsorbs gaseous water, carbon dioxide, oxygen etc. in the air; the unadsorbed oxygen, and less easily adsorbed components such as nitrogen and argon are discharged from an outlet and evacuated by opening the program-controlled valve KV2A-1; with the passage of time, the total amount of gaseous water, carbon dioxide, oxygen etc. adsorbed by the adsorbent is continuously increasing; and when the concentration of oxygen at an outlet of the adsorption tower T0101A is about 7-12% (V), the air intake is stopped, and the adsorption is finished.

(2) Pathwise Pressure Release PP

After the adsorption is finished, the program-controlled valve KV1A-1 is closed, and the program-controlled valve KV2A-1 keeps open; a dead space gas in the adsorption tower T0101A will be discharged from an outlet of the adsorption tower and evacuated; and when the pressure drops to approximately the normal pressure, the program-controlled valve KV2A-1 is closed, and the pathwise pressure release PP is finished.

(3) Vacuumizing VC

After the pathwise pressure release PP of the adsorption tower T0101A is finished, a program-controlled valve KV3A-1 is opened and the gaseous water, carbon dioxide, oxygen and nitrogen absorbed by the adsorbent are pumped out from the bottom of the adsorption tower with a vacuum pump, and enters into a compressor buffer tank (V0201), so that the adsorbent is regenerated, and an oxygen-enriched intermediate gas is obtained at the same time.

After the above steps, the adsorption tower T0101A completes one cycle and is prepared for the raw gas adsorption again; and the operation of other adsorption towers in the first PSA section are exactly the same as that of the adsorption tower T0101A, except that they are staggered operation.

The adsorption towers of the second PSA section and the third PSA section sequentially undergo the same steps and switching sequence of program-controlled valves in one cycle as those of the second PSA section and the third PSA section in Example 1.

Results of the present Example show that the concentration of oxygen in the product is greater than or equal to 99.5% (V), the pressure is greater than or equal to 1.0 MPa, and the cost of using oxygen is 30% lower than that of bottled oxygen.

Example 5

FIG. 9 is a diagram showing operation steps of adsorption towers of various sections and switching sequence of program-controlled valves in Example 5 of the present disclosure.

FIG. 4 is a process flow chart of Example 5 of the present disclosure.

Composition of raw air in the present Example is as follows:

| Component | $O_2$ | $N_2$ | Ar | $CO_2$ | Others | Σ |
|---|---|---|---|---|---|---|
| Concentration(%)(V) | 20.93 | 78.03 | 0.932 | 0.03 | 0.078 | 100 |

Temperature: ≤40° C.
Pressure: 0.2 MPa (G)

As shown in FIG. 4, an air compressor C0101, a vacuum buffer tank V0101, a vacuum pump P0101, program-controlled valves, a PLC control system, instruments, pipe fittings and adsorption towers T0101A, T0101B and T0101C form the first PSA section; adsorbents charged in the adsorption towers from bottom to top are activated alumina and carbon molecular sieves in turn; in the first PSA section, single tower adsorption, pressure equalization and vacuumizing steps are run. A rich oxygen compressor C0201, a compressor buffer tank V0201, program-controlled valves, a PLC control system, instruments, pipe fittings and adsorption towers T0201A, T0201B and T0201C form the second PSA section; adsorbents charged in the adsorption towers from bottom to top are activated alumina, and 5-type molecular sieves or X-type lithium molecular sieves in turn; in the second PSA section, single tower adsorption, pressure equalization, backward discharge and recompression steps are run. A product of pure oxygen buffer tank V0301, program-controlled valves, a PLC control system, instruments, pipe fittings, a pressure-stabilizing valve, adsorption towers T0301A, T0301B and T0301C form the third PSA section; adsorbents charged in the adsorption towers are 5-type molecular sieves or X-type lithium molecular sieves; in the third PSA section, single tower adsorption, pressure equalization and backward discharge steps are run. In the present Example, the above three PSA sections are operated in series; the first PSA section adsorbs gaseous water, carbon dioxide and oxygen in the air; the second PSA section is used for adsorbing the gaseous water, carbon dioxide and nitrogen desorbed by the first PSA section, and increasing the concentration of oxygen to about 85-96% (V); and the third PSA section is used for adsorbing nitrogen from a gas mixture flowing out from the adsorption tower of the second PSA section in the step of adsorption A and having a concentration of oxygen of 85-96% (V), and increasing the concentration of oxygen to above 99.5% (V).

The raw air is boosted to 0.2 MPa (G) by the air compressor (C0101) and enters into the adsorption tower of the first PSA section so as to implement the step of adsorption; the adsorbent in the adsorption tower selectively and sequentially adsorbs gaseous water, carbon dioxide, oxygen etc. in the air; and the unadsorbed oxygen, and less easily adsorbed components such as nitrogen and argon are discharged from an outlet and evacuated. After the adsorption of the adsorption tower of the first PSA section is finished, vacuumizing is carried out after pressure equalization; gaseous water, carbon dioxide, oxygen and nitrogen pumped out by the vacuum pump are compressed to 1.2 MPa by the compressor buffer tank (V0201) and the rich oxygen compressor (C0201) and then enter into the adsorption tower of the second PSA section so as to implement the step of adsorption; the adsorbent in the adsorption tower selectively and sequentially adsorbs gaseous water, carbon dioxide and nitrogen in the oxygen-enriched gas mixture; and less easily adsorbed components such as oxygen and argon flow out from the outlet and enter into the adsorption tower of the third PSA section so as to implement the step of adsorption. The adsorbent in the adsorption tower further adsorbs the nitrogen in the oxygen-enriched gas mixture; and less easily adsorbed components such as oxygen and argon flow out from the outlet and enter into the product of pure oxygen buffer tank (V0301). After the adsorption of the adsorption tower of the first PSA section is finished, the concentration of oxygen in the outlet gas is controlled at 7-12% (V); and the adsorption tower of the first PSA section sequentially undergoes PSA steps of adsorption A, pressure-equalizing drop ED, vacuumizing VC and pressure-equalizing rise ER in one cycle. The concentration of oxygen in the outlet gas of the adsorption tower of the second PSA section in the step of adsorption is controlled at about 85-96% (V); and the adsorption tower sequentially undergoes the PSA steps of adsorption A, pressure-equalizing drop ED, backward discharge BD, pressure-equalizing rise ER and final pressure rise FR in one cycle. The concentration of oxygen in the outlet gas of the adsorption tower of the third PSA section in the adsorption step is controlled above 99.5% (V); and the adsorption tower sequentially undergoes the PSA steps of adsorption A, pressure-equalizing drop ED, backward discharge BD and pressure-equalizing rise ER in one cycle. A total recovery rate of oxygen is about 85%; the concentration of oxygen in the vacuum desorption gas of the first section is about 80%; the circulation time of the adsorption tower of each PSA section is generally 20-80 seconds; the vacuum degree of the first section is −0.095 MPa; and the air volume of the compressor, the superficial velocity of the adsorption towers of each PSA section, the pumping volume of the vacuum pump, the amount of used adsorbent, the diameter of the adsorption tower and other design parameters are designed according to general conditions in the technical field of PSA.

Each adsorption tower in the present disclosure sequentially undergoes the following steps in one cycle.

The adsorption tower of the first PSA section sequentially undergoes the same steps and switching sequence of program-controlled valves in one cycle as that of the first PSA section in Example 2.

Second PSA Section (1) Adsorption A

A program-controlled valve KV1A-2 of the second PSA section is opened; the oxygen-enriched gas mixture pumped out in the step of vacuumizing (VC) of the adsorption tower of the first PSA section is fed into the compressor buffer tank (V0201), is compressed to 1.2 MPa by a rich oxygen compressor (C0201), and then enters into an adsorbent bed of an adsorption tower T0201A; an adsorbent in the adsorption tower T0201A selectively and sequentially adsorbs gaseous water, carbon dioxide, nitrogen etc. in the oxygen-enriched gas mixture; the unadsorbed nitrogen, and less easily adsorbed components such as oxygen and argon flow out from the outlet and enter into the adsorption tower of the third PSA section so as to implement the step of adsorption by opening the program-controlled valve KV2A-2; with the passage of time, the total amount of gaseous water, carbon dioxide, nitrogen etc. adsorbed by the adsorbent is continuously increasing; and when the gaseous water, carbon dioxide and nitrogen adsorbed by the adsorption tower T0201A is saturated, the air intake is stopped, and the adsorption is finished.

(2) Pressure-Equalizing Drop ED

After the adsorption is finished, program-controlled valves KV3A-2 and KV3C-2 are opened; and a dead space gas in the adsorption tower T0201A will be discharged from the outlet of the adsorption tower and enter into the adsorption tower T0201C, which has completed the step of backward discharge BD in this PSA section, to rise the pressure, so that the two towers have the same pressure as much as possible.

(3) Backward Discharge BD

After the pressure-equalizing drop ED of the adsorption tower T0201A is finished, a program-controlled valve KV4A-2 is opened to evacuate the gas in the adsorption tower T0201A backwards until the pressure is close to a normal pressure.

(4) Pressure-Equalizing Rise ER

After the backward discharge BD of the adsorption tower T0201A is finished, program-controlled valves KV3A-2 and KV3B-2 are opened; a gas discharged in the step of pressure-equalizing drop ED of the adsorption tower T0201B enters into the adsorption tower from the outlet of the adsorption tower T0201A, to rise the pressure of the adsorption tower T0201A, so that the adsorption towers T0201A and T0201B have the same pressure as much as possible.

(5) Final Pressure Rise FR

After the pressure-equalizing rise ER is finished, the program-controlled valve KV3A-2 is closed, and the program-controlled valve KV2A-2 is opened; and the outlet gas in the adsorption step used for boosting the adsorption tower T0201A until the pressure is close to the adsorption pressure of the second PSA section.

After the above steps, the adsorption tower T0201A completes one cycle and is prepared for the raw gas adsorption again; and the operation of other adsorption towers in the second PSA section are exactly the same as that of the adsorption tower T0201A, except that they are staggered operation.

The adsorption tower of the third PSA section sequentially undergoes the same steps and switching sequence of program-controlled valves in one cycle as that of the third PSA section in Example 1.

Results of the present Example show that the concentration of oxygen in the product is greater than or equal to 99.5% (V), the pressure is greater than or equal to 1.0 MPa, and the cost of using oxygen is 40% lower than that of bottled oxygen.

Example 6

FIG. 11 is a diagram showing operation steps of adsorption towers of various PSA sections and switching sequence of program-controlled valves in Example 6 of the present disclosure. FIG. 4 is a process flow chart of Example 6 of the present disclosure.

Composition of raw air in the present Example is as follows:

| Component | O$_2$ | N$_2$ | Ar | CO$_2$ | Others | Σ |
|---|---|---|---|---|---|---|
| Concentration(%)(V) | 20.93 | 78.03 | 0.932 | 0.03 | 0.078 | 100 |

Temperature: ≤40° C.
Pressure: 0.2 MPa (G)

As shown in FIG. 4, an air compressor C0101, a vacuum buffer tank V0101, a vacuum pump P0101, program-controlled valves, a PLC control system, instruments, pipe fittings and adsorption towers T0101A, T0101B and T0101C form the first PSA section; adsorbents charged in the adsorption towers from bottom to top are activated alumina and carbon molecular sieves in turn; in the first PSA section, single tower adsorption, pressure equalization and vacuumizing steps are run. A rich oxygen compressor C0201, a compressor buffer tank V0201, program-controlled valves, a PLC control system, instruments, pipe fittings and adsorption towers T0201A, T0201B and T0201C form the second PSA section; adsorbents charged in the adsorption towers from bottom to top are activated alumina, and 5-type molecular sieves or X-type lithium molecular sieves in turn; in the second PSA section, single tower adsorption, pressure equalization, backward discharge and recompression steps are run. A product of pure oxygen buffer tank V0301, program-controlled valves, a PLC control system, instruments, pipe fittings, a pressure-stabilizing valve, adsorption towers T0301A, T0301B and T0301C form the third PSA section; adsorbents in the third PSA section, single tower adsorption, pressure equalization, backward discharge and recompression steps are run. In the present Example, the above three PSA sections are operated in series; the first PSA section adsorbs gaseous water, carbon dioxide and oxygen in the air; the second PSA section is used for adsorbing the gaseous water, carbon dioxide and nitrogen desorbed by the first PSA section, and increasing the concentration of oxygen to 85-96% (V); and the third PSA section is used for adsorbing nitrogen from a gas mixture flowing out from the adsorption tower of the second PSA section in the step of adsorption A and having a concentration of oxygen of 85-96% (V), and increasing the concentration of oxygen to above 99.5% (V).

The raw air is boosted to 0.2 MPa (G) by the air compressor (C0101) and enters into the adsorption tower of the first PSA section so as to implement the step of adsorption; the adsorbent in the adsorption tower selectively and sequentially adsorbs gaseous water, carbon dioxide, oxygen etc. in the air; and the unadsorbed oxygen, and less easily adsorbed components such as nitrogen and argon are discharged from an outlet and evacuated. After the adsorption of the adsorption tower of the first PSA section is finished, vacuumizing is carried out after pressure equalization; gaseous water, carbon dioxide, oxygen and nitrogen pumped out by the vacuum pump are compressed to 1.2 MPa by the compressor buffer tank (V0201) and the rich oxygen compressor (C0201) and then enter into the adsorption tower of the second PSA section so as to implement the step of adsorption; the adsorbent in the adsorption tower selectively and sequentially adsorbs gaseous water, carbon dioxide and nitrogen in the oxygen-enriched gas mixture; and less easily adsorbed components such as oxygen and argon flow out from the outlet and enter into the adsorption tower of the third PSA section so as to implement the step of adsorption. The adsorbent in the adsorption tower further adsorbs the nitrogen in the oxygen-enriched gas mixture; and less easily adsorbed components such as oxygen and argon flow out from the outlet and enter into the product of pure oxygen buffer tank (V0301). After the adsorption of the adsorption tower of the first PSA section is finished, the concentration of oxygen in the outlet gas is controlled about 7-12% (V); and the adsorption tower of the first PSA section sequentially undergoes PSA steps of adsorption A, pressure-equalizing drop ED, vacuumizing VC and pressure-equalizing rise ER in one cycle. The concentration of oxygen in the outlet gas of the adsorption tower of the second PSA section in the step of adsorption is controlled at about 85-96% (V); and the adsorption tower sequentially undergoes the PSA steps of adsorption A, pressure-equalizing drop ED, backward discharge BD, pressure-equalizing rise ER and final pressure rise FR in one cycle. The concentration of oxygen in the outlet gas of the adsorption tower of the third PSA section in the adsorption step is controlled above 99.5% (V); and the adsorption tower sequentially undergoes the PSA steps of adsorption A, pressure-equalizing drop ED, backward discharge BD, pressure-equalizing rise ER and final pressure rise FR in one cycle. A total recovery rate of oxygen is about 85%; the concentration of oxygen in the vacuum desorption gas of the first section is about 80%; the circulation time of the adsorption tower of each PSA section is generally 20-80 seconds; the vacuum degree of the first section is −0.095 MPa; and the air volume of the compressor, the superficial velocity of the adsorption towers of each PSA section, the pumping volume of the vacuum pump, the amount of used adsorbent, the diameter of the adsorption tower and other design parameters are designed according to general conditions in the technical field of PSA.

Each adsorption tower in the present disclosure sequentially undergoes the following steps in one cycle.

The adsorption tower of the first PSA section sequentially undergoes the same steps and switching sequence of program-controlled valves in one cycle as that of the first PSA section in Example 2.

The adsorption tower of the second PSA section sequentially undergoes the same steps and switching sequence of program-controlled valves in one cycle as that of the second PSA section in Example 5.

Third PSA Section (1) Adsorption A

A program-controlled valve KV1A-3 of the third PSA section is opened; the oxygen-enriched gas mixture flowing out from the outlet of the adsorption tower of the second PSA section in the step of adsorption A enters into the adsorption tower T0301A of the third PSA section; an adsorbent in the adsorption tower further adsorbs nitrogen in the oxygen-enriched gas mixture; and the less easily adsorbed components such as oxygen and argon flow out from the outlet and enter into a product of pure oxygen buffer tank (V0301). With the passage of time, the total amount of nitrogen adsorbed by the adsorbent is continuously increasing; when the nitrogen adsorbed by the adsorption tower T0301A is saturated, the air intake is stopped, and the adsorption is finished.

(2) Pressure-Equalizing Drop ED

After the adsorption is finished, program-controlled valves KV3A-3 and KV3C-3 are opened; and a dead space gas in the adsorption tower T0301A will be discharged from the outlet of the adsorption tower and enter the adsorption tower T0301C, which has completed the step of backward discharge BD in this PSA section, to rise the pressure, so that the two towers have the same pressure as much as possible.

(3) Backward Discharge BD

After the pressure-equalizing drop ED of the adsorption tower T0301A is finished, a program-controlled valve KV4A-3 is opened to evacuate the gas in the adsorption tower T0301A backwards until the pressure is close to a normal pressure.

(4) Pressure-Equalizing Rise ER

After the backward discharge BD of the adsorption tower T0301A is finished, program-controlled valves KV3A-3 and KV3B-3 are opened; a gas discharged in the step of pressure-equalizing drop ED of an adsorption tower T0301B enters into the adsorption tower from the outlet of the adsorption tower T0301A, to rise the pressure of the adsorption tower T0301A, so that the adsorption towers T0301A and T0301B have the same pressure as much as possible.

(5) Final Pressure Rise FR

After the pressure-equalizing rise ER is finished, the program-controlled valve KV3A-3 is closed, and the program-controlled valve KV2A-3 is opened; and the outlet gas in the adsorption step is used for boosting the adsorption tower T0301A until the pressure is close to the adsorption pressure of the third PSA section.

After the above steps, the adsorption tower T0301A completes one cycle and is prepared for the raw gas adsorption again; and the operation of other adsorption towers in this PSA section are exactly the same as that of the adsorption tower T0301A, except that they are staggered operation.

Results of the present Example show that the concentration of oxygen in the product is greater than or equal to 99.5% (V), the pressure is greater than or equal to 1.0 MPa, and the cost of using oxygen is 40% lower than that of bottled oxygen.

Example 7

FIG. 13 is a diagram showing operation steps of adsorption towers of various sections and switching sequence of program-controlled valves in Example 7 of the present disclosure.

Figure 10:
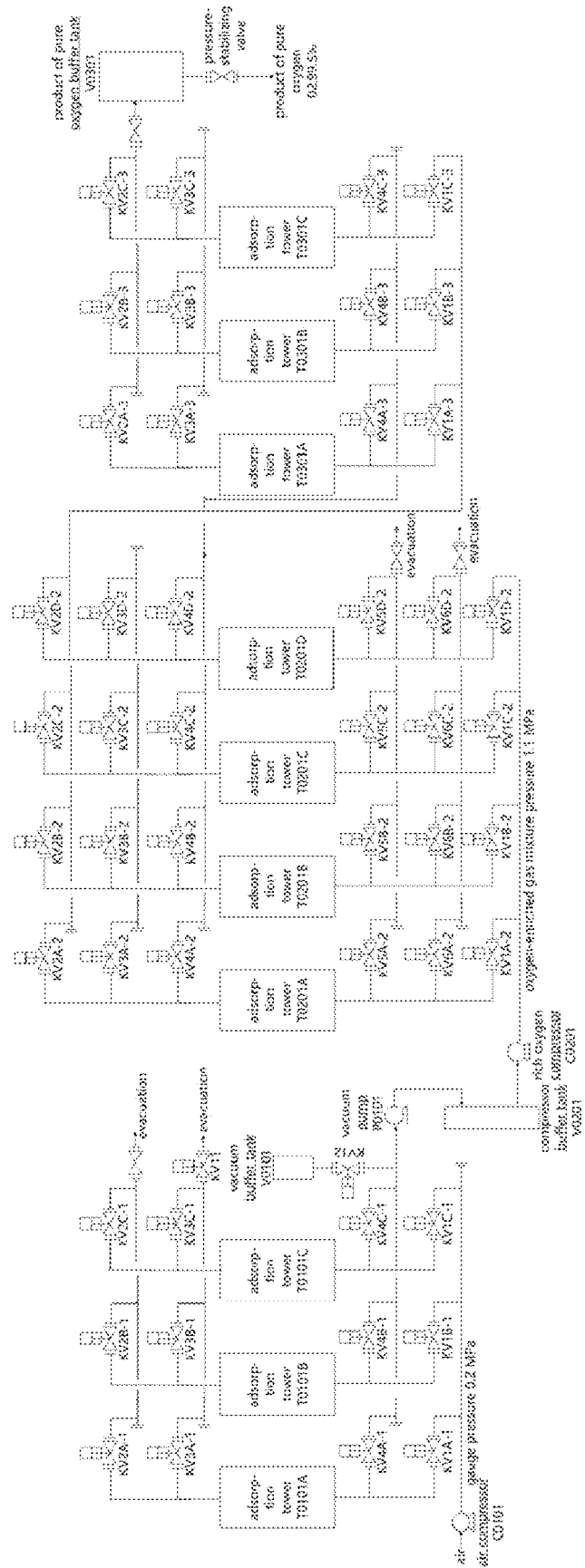
FIG. 10 is a process flow chart of Example 7 of the present disclosure.

FIG. 10 is a process flow chart of Example 7 of the present disclosure.

Composition of raw air in the present Example is as follows:

| Component | $O_2$ | $N_2$ | Ar | $CO_2$ | Others | Σ |
|---|---|---|---|---|---|---|
| Concentration(%)(V) | 20.93 | 78.03 | 0.932 | 0.03 | 0.078 | 100 |

Temperature: ≤40° C.
Pressure: 0.2 MPa (G)

As shown in FIG. 10, an air compressor C0101, a vacuum buffer tank V0101, a vacuum pump P0101, program-controlled valves, a PLC control system, instruments, pipe fittings and adsorption towers T0101A, T0101B and T0101C form the first PSA section; adsorbents charged in the adsorption towers from bottom to top are activated alumina and carbon molecular sieves in turn; in the first PSA section, single tower adsorption, pressure equalization and vacuumizing steps are run. A rich oxygen compressor C0201, a compressor buffer tank V0201, program-controlled valves, a PLC control system, instruments, pipe fittings and adsorption towers T0201A, T0201B, T0201C and T0201D form the second PSA section; adsorbents charged in the adsorption towers from bottom to top are activated alumina, and 5-type molecular sieves or X-type lithium molecular sieves in turn; in the second PSA section, single tower adsorption, pressure equalization, backward discharge, third-section desorption gas purging and recompression steps are run. A product of pure oxygen buffer tank V0301, program-controlled valves, a PLC control system, instruments, pipe fittings, a pressure-stabilizing valve, adsorption towers T0301A, T0301B and T0301C form the third PSA section; adsorbents charged in the adsorption towers are 5-type molecular sieves or X-type lithium molecular sieves; in the third PSA section, single tower adsorption, pressure equalization, backward discharge and recompression steps are run. In the present Example, the above three PSA sections are operated in series; the first PSA section adsorbs gaseous water, carbon dioxide and oxygen in the air; the second PSA section is used for adsorbing the gaseous water, carbon dioxide and nitrogen desorbed by the first PSA section, and increasing the concentration of oxygen to about 85-96% (V); and the third PSA section is used for adsorbing nitrogen from a gas mixture flowing out the adsorption tower of the second PSA section in the step of adsorption A and having a concentration of oxygen of 85-96% (V), and increasing the concentration of oxygen to above 99.5% (V).

The raw air is boosted to 0.2 MPa (G) by the air compressor (C0101) and enters into the adsorption tower of the first PSA section so as to implement the step of adsorption; the adsorbent in the adsorption tower selectively and sequentially adsorbs gaseous water, carbon dioxide, oxygen etc. in the air; and the unadsorbed oxygen, and less easily adsorbed components such as nitrogen and argon are discharged from an outlet and evacuated. After the adsorption of the adsorption tower of the first PSA section is finished, vacuumizing is carried out after pressure equalization; gaseous water, carbon dioxide, oxygen and nitrogen pumped out by the vacuum pump are compressed to 1.2 MPa by the compressor buffer tank (V0201) and the rich oxygen compressor (C0201) and then enter into the adsorption tower of the second PSA section so as to implement the step of adsorption; the adsorbent in the adsorption tower selectively and sequentially adsorbs gaseous water, carbon dioxide and nitrogen in the oxygen-enriched gas mixture; and less easily adsorbed components such as oxygen and argon flow out from the outlet and enter into the adsorption tower of the third PSA section so as to implement the step of adsorption. The adsorbent in the adsorption tower further adsorbs the nitrogen in the oxygen-enriched gas mixture; and less easily adsorbed components such as oxygen and argon flow out from the outlet and enter into the product of pure oxygen buffer tank (V0301). After the adsorption of the adsorption tower of the first PSA section is finished, the concentration of oxygen in the outlet gas is controlled at 7-12% (V); and the adsorption tower of the first PSA section sequentially undergoes PSA steps of adsorption A, pressure-equalizing drop ED, vacuumizing VC and pressure-equalizing rise ER in one cycle. The concentration of oxygen in the outlet gas of the adsorption tower of the second PSA section in the step of adsorption is controlled at about 85-96% (V); and the adsorption tower sequentially undergoes the PSA steps of adsorption A, pressure-equalizing drop ED, backward discharge BD, third-section desorption gas purging P3, pressure-equalizing rise ER and final pressure rise FR in one cycle. The concentration of oxygen in the outlet gas of the adsorption tower of the third PSA section in the adsorption step is controlled above 99.5% (V); and the adsorption tower sequentially undergoes the PSA steps of adsorption A, pressure-equalizing drop ED, backward discharge BD, pressure-equalizing rise ER and final pressure rise FR in one cycle. A total recovery rate of oxygen is about 85%; the concentration of oxygen in the vacuum desorption gas of the first section is about 80%; the circulation time of the adsorption tower of each PSA section is generally 20-80 seconds; the vacuum degree of the first section is −0.095 MPa; and the air volume of the compressor, the superficial velocity of the adsorption towers of each PSA section, the pumping volume of the vacuum pump, the amount of used adsorbent, the diameter of the adsorption tower and other design parameters are designed according to general conditions in the technical field of PSA.

Each adsorption tower in the present disclosure sequentially undergoes the following steps in one cycle.

The adsorption tower of the first PSA section sequentially undergoes the same steps and switching sequence of program-controlled valves in one cycle as that of the first PSA section in Example 2.

Second PSA Section (1) Adsorption A

A program-controlled valve KV1A-2 of the second PSA section is opened; the oxygen-enriched gas mixture pumped out in the step of vacuumizing (VC) of the adsorption tower of the first PSA section is fed into the compressor buffer tank (V0201), is compressed to 1.2 MPa by a rich oxygen compressor (C0201), and then enters into an adsorbent bed of an adsorption tower T0201A; an adsorbent in the adsorption tower T0201A selectively and sequentially adsorbs gaseous water, carbon dioxide, nitrogen etc. in the oxygen-enriched gas mixture; the unadsorbed nitrogen, and less easily adsorbed components such as oxygen and argon flow out from the outlet and enter into the adsorption tower of the third PSA section so as to implement the step of adsorption by opening the program-controlled valve KV2A-2; with the passage of time, the total amount of gaseous water, carbon dioxide, nitrogen etc. adsorbed by the adsorbent is continuously increasing; and when the gaseous water, carbon dioxide and nitrogen adsorbed by the adsorption tower T0201A is saturated, the air intake is stopped, and the adsorption is finished.

(2) Pressure-Equalizing Drop ED

After the adsorption is finished, program-controlled valves KV3A-2 and KV3C-2 are opened; and a dead space gas in the adsorption tower T0201A will be discharged from the outlet of the adsorption tower and enter into the adsorption tower T0201C, which has completed the step of backward discharge BD in this section, to rise the pressure, so that the two towers have the same pressure as much as possible.

(3) Backward Discharge BD

After the pressure-equalizing drop ED of the adsorption tower T0201A is finished, a program-controlled valve KV5A-2 is opened to evacuate the gas in the adsorption tower T0201A backwards until the pressure is close to a normal pressure.

(4) Third-Section Desorption Gas Purging P3

After the backward discharge BD of the adsorption tower T0201A is finished, program-controlled valves KV4A-2 and KV6A-2 are opened; and a gas mixture desorbed in the step of backward discharge BD of the adsorption tower of the third PSA section enters into the adsorption tower from the outlet of the adsorption tower T0201A through the program-controlled valve KV4A-2, and then is discharged from the bottom of the adsorption tower T0201A through the program-controlled valve KV6A-2 and evacuated.

(5) Pressure-Equalizing Rise ER

After the third-section desorption gas purging P3 of the adsorption tower T0201A is finished, program-controlled valves KV3A-2 and KV3C-2 are opened; a gas discharged in the step of pressure-equalizing drop ED of the adsorption tower T0201C enters into the adsorption tower from the outlet of the adsorption tower T0201A, to rise the pressure of the adsorption tower T0201A, so that the adsorption towers T0201A and T0201C have the same pressure as much as possible.

(6) Final Pressure Rise FR

After the pressure-equalizing rise ER is finished, the program-controlled valve KV3A-2 is closed, and the program-controlled valve KV2A-2 is opened; and the outlet gas in the adsorption step is used for boosting the adsorption tower T0201A until the pressure is close to the adsorption pressure of the second PSA section.

After the above steps, the adsorption tower T0201A completes one cycle and is prepared for the raw gas adsorption again; and the operation of other adsorption towers in this PSA section are exactly the same as that of the adsorption tower T0201A, except that they are staggered operation.

Results of the present Example show that the concentration of oxygen in the product is greater than or equal to 99.5% (V), the pressure is greater than or equal to 1.0 MPa, and the cost of using oxygen is 45% lower than that of bottled oxygen.

Example 8

FIG. 15 is a diagram showing operation steps of adsorption towers of various sections and switching sequence of program-controlled valves in Example 8 of the present disclosure.

Figure 12:
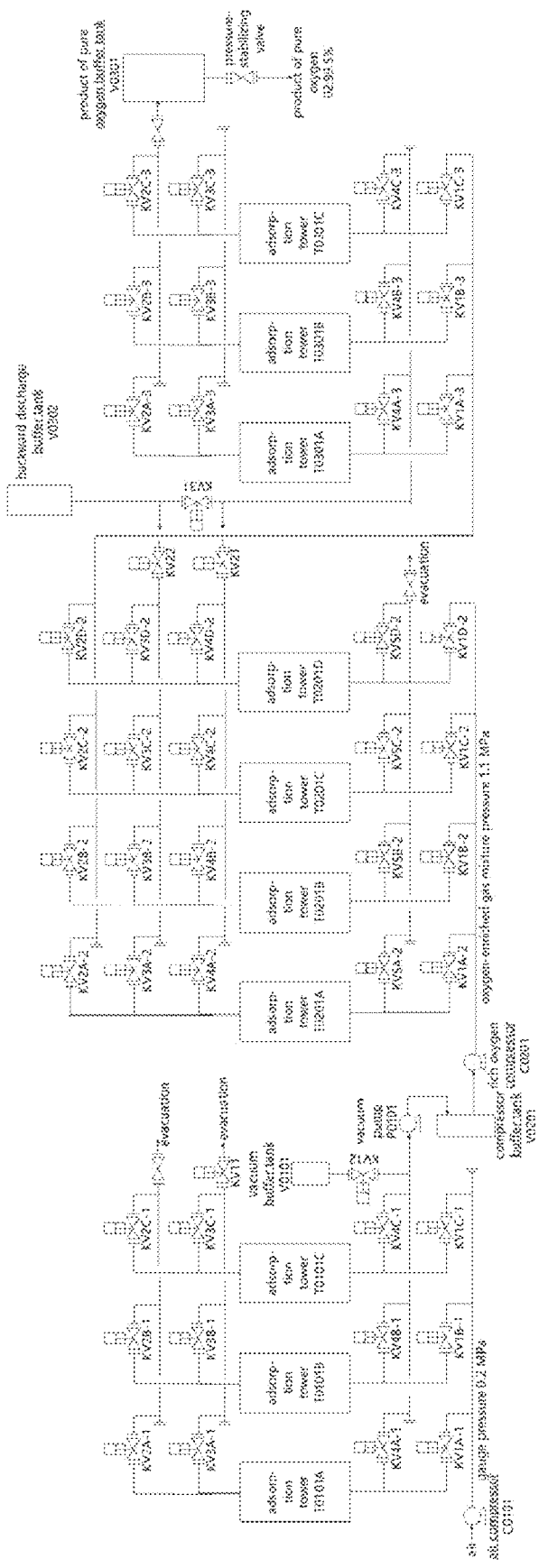
FIG. 12 is a process flow chart of Example 8 of the present disclosure.

FIG. 12 is a process flow chart of Example 8 of the present disclosure.

Composition of raw air in the present Example is as follows:

| Component | $O_2$ | $N_2$ | Ar | $CO_2$ | Others | Σ |
|---|---|---|---|---|---|---|
| Concentration(%)(V) | 20.93 | 78.03 | 0.932 | 0.03 | 0.078 | 100 |

Temperature: ≤40° C.
Pressure: 0.2 MPa (G)

As shown in FIG. 12, an air compressor C0101, a vacuum buffer tank V0101, a vacuum pump P0101, program-controlled valves, a PLC control system, instruments, pipe fittings and adsorption towers T0101A, T0101B and T0101C form the first PSA section; adsorbents charged in the adsorption towers from bottom to top are activated alumina and carbon molecular sieves in turn; in the first PSA section, single tower adsorption, pressure equalization and vacuumizing steps are run. A rich oxygen compressor C0201, a compressor buffer tank V0201, program-controlled valves, a PLC control system, instruments, pipe fittings and adsorption towers T0201A, T0201B, T0201C and T0201D form the second PSA section; adsorbents charged in the adsorption towers from bottom to top are activated alumina, and 5-type molecular sieves or X-type lithium molecular sieves in turn; in the second PSA section, single tower adsorption, pressure equalization, backward discharge, third-section desorption gas purging, third-section desorption gas pressure rise and recompression steps are run. A product of pure oxygen buffer tank V0301, a backward discharge buffer tank V0302, program-controlled valves, a PLC control system, instruments, pipe fittings, a pressure-stabilizing valve, adsorption towers T0301A, T0301B and T0301C form the third PSA section; adsorbents charged in the adsorption towers are 5-type molecular sieves or X-type lithium molecular sieves; in the third PSA section, single tower adsorption, pressure equalization, backward discharge and recompression steps are run. In the present Example, the above three PSA sections are operated in series; the first PSA section adsorbs gaseous water, carbon dioxide and oxygen in the air; the second PSA section is used for adsorbing the gaseous water, carbon dioxide and nitrogen desorbed by the first PSA section, and increasing the concentration of oxygen to about 85-96% (V); and the third PSA section is used for adsorbing nitrogen from a gas mixture flowing out from the adsorption tower of the second PSA section in the step of adsorption A and having a concentration of oxygen of 85-96% (V), and increasing the concentration of oxygen to above 99.5% (V).

The raw air is boosted to 0.2 MPa (G) by the air compressor (C0101) and enters into the adsorption tower of the first PSA section so as to implement the step of adsorption; the adsorbent in the adsorption tower selectively and sequentially adsorbs gaseous water, carbon dioxide, oxygen etc. in the air; and the unadsorbed oxygen, and less easily adsorbed components such as nitrogen and argon are discharged from an outlet and evacuated. After the adsorption of the adsorption tower of the first PSA section is finished, vacuumizing is carried out after pressure equalization; gaseous water, carbon dioxide, oxygen and nitrogen pumped out by the vacuum pump are compressed to 1.2 MPa by the compressor buffer tank (V0201) and the rich oxygen compressor (C0201) and then enter into the adsorption tower of the second PSA section so as to implement the step of adsorption; the adsorbent in the adsorption tower selectively and sequentially adsorbs gaseous water, carbon dioxide and nitrogen in the oxygen-enriched gas mixture; and less easily adsorbed components such as oxygen and argon flow out from the outlet and enter into the adsorption tower of the third PSA section so as to implement the step of adsorption. The adsorbent in the adsorption tower further adsorbs the nitrogen in the oxygen-enriched gas mixture; and less easily adsorbed components such as oxygen and argon flow out from the outlet and enter into the product of pure oxygen buffer tank (V0301). After the adsorption of the adsorption tower of the first PSA section is finished, the concentration of oxygen in the outlet gas is controlled at 7-12% (V); and the adsorption tower of the first PSA section sequentially undergoes PSA steps of adsorption A, pressure-equalizing drop ED, vacuumizing VC and pressure-equalizing rise ER in one cycle. The concentration of oxygen in the outlet gas of the adsorption tower of the second PSA section in the step of adsorption is controlled at about 85-96% (V); and the adsorption tower sequentially undergoes the PSA steps of adsorption A, pressure-equalizing drop ED, backward discharge BD, third-section desorption gas purging P3, third-section desorption gas pressure rise R3, pressure-equalizing rise ER and final pressure rise FR in one cycle. The concentration of oxygen in the outlet gas of the adsorption tower of the third PSA section in the adsorption step is controlled above 99.5% (V); and the adsorption tower sequentially undergoes the PSA steps of adsorption A, pressure-equalizing drop ED, backward discharge BD, pressure-equalizing rise ER and final pressure rise FR in one cycle. A total recovery rate of oxygen is about 85%; the concentration of oxygen in the vacuum desorption gas of the first section is about 80%; the circulation time of the adsorption tower of each PSA section is generally 20-80 seconds; the vacuum degree of the first section is −0.095 MPa; and the air volume of the compressor, the superficial velocity of the adsorption towers of each PSA section, the pumping volume of the vacuum pump, the amount of used adsorbent, the diameter of the adsorption tower and other design parameters are designed according to general conditions in the technical field of PSA.

Each adsorption tower in the present disclosure sequentially undergoes the following steps in one cycle.

The adsorption tower of the first PSA section sequentially undergoes the same steps and switching sequence of program-controlled valves in one cycle as that of the first PSA section in Example 2.

Second PSA Section (1) Adsorption A

A program-controlled valve KV1A-2 of the second PSA section is opened; the oxygen-enriched gas mixture pumped out in the step of vacuumizing (VC) of the adsorption tower of the first PSA section is fed into the compressor buffer tank (V0201), is compressed to 1.2 MPa by a rich oxygen compressor (C0201), and then enters into an adsorbent bed of an adsorption tower T0201A; an adsorbent in the adsorption tower T0201A selectively and sequentially adsorbs gaseous water, carbon dioxide, nitrogen etc. in the oxygen-enriched gas mixture; the unadsorbed nitrogen, and less easily adsorbed components such as oxygen and argon flow out from the outlet and enter into the adsorption tower of the third PSA section so as to implement the step of adsorption by opening the program-controlled valve KV2A-2; with the passage of time, the total amount of gaseous water, carbon dioxide, nitrogen and other components adsorbed by the adsorbent is continuously increasing; and when the gaseous water, carbon dioxide and nitrogen adsorbed by the adsorption tower T0201A is saturated, the air intake is stopped, and the adsorption is finished.

(2) Pressure-Equalizing Drop ED

After the adsorption is finished, program-controlled valves KV3A-2 and KV3C-2 are opened; and a dead space gas in the adsorption tower T0201A will be discharged from the outlet of the adsorption tower and enter the adsorption tower T0201C, which has completed the step of backward discharge BD in this section, to rise the pressure, so that the two towers have the same pressure as much as possible.

(3) Backward Discharge BD

After the pressure-equalizing drop ED of the adsorption tower T0201A is finished, a program-controlled valve KV5A-2 is opened to evacuate the gas in the adsorption tower T0201A backwards until the pressure is close to a normal pressure.

(4) Third-Section Desorption Gas Purging P3

After the backward discharge BD of the adsorption tower T0201A is finished, program-controlled valves KV4A-2 and KV21 are opened; and a gas mixture desorbed in later period of the step of backward discharge BD of the adsorption tower of the third PSA section enters into the adsorption tower from the outlet of the adsorption tower T0201A through the program-controlled valve KV4A-2, and then is discharged from the bottom of the adsorption tower T0201A through the program-controlled valve KV5A-2 and evacuated.

(5) Third-Section Desorption Gas Pressure Rise R3

After the third-section desorption gas purging P3 of the adsorption tower T0201A is finished, program-controlled valves KV3A-2 and KV22 are opened; a gas mixture of the backward discharge buffer tank (V0302) enters into the adsorption tower T0201A from the outlet of the adsorption tower T0201A through the program-controlled valve KV3A-2, to rise the pressure until the adsorption tower T0201A has the same pressure as the backward discharge buffer tank (V0302).

(6) Pressure-Equalizing Rise ER

After the third-section desorption gas pressure rise R3 of the adsorption tower T0201A is finished, program-controlled valves KV3A-2 and KV3C-2 are opened; a gas discharged in the step of pressure-equalizing drop ED of the adsorption tower T0201C enters into the adsorption tower from the outlet of the adsorption tower T0201A, to rise the pressure of the adsorption tower T0201A until the adsorption towers T0201A and T0201C have the same pressure.

(7) Final Pressure Rise FR

After the pressure-equalizing rise ER is finished, the program-controlled valve KV3A-2 is closed, and the program-controlled valve KV2A-2 is opened; and the outlet gas in the adsorption step is used for boosting the adsorption tower T0201A until the pressure is close to the adsorption pressure of the second PSA section.

After the above steps, the adsorption tower T0201A completes one cycle and is prepared for the raw gas adsorption again; and the operation of other adsorption towers in this PSA section are exactly the same as that of the adsorption tower T0201A in steps and sequences, except that they are staggered operation.

Third PSA Section (1) Adsorption A

A program-controlled valve KV1A-3 of the third PSA section is opened; the oxygen-enriched gas mixture flowing out from the outlet in the step of adsorption A of the adsorption tower of the second PSA section enters into the adsorption tower T0301A of the third PSA section; an adsorbent in the adsorption tower further adsorbs nitrogen in the oxygen-enriched gas mixture; and the less easily adsorbed components such as oxygen and argon flow out from the outlet and enter into a product of pure oxygen buffer tank (V0301). With the passage of time, the total amount of nitrogen adsorbed by the adsorbent is continuously increasing; and when the nitrogen adsorbed by the adsorption tower T0301A is saturated, the air intake is stopped, and the adsorption is finished.

(2) Pressure-Equalizing Drop ED

After the adsorption is finished, program-controlled valves KV3A-3 and KV3C-3 are opened; and a dead space gas in the adsorption tower T0301A will be discharged from the outlet of the adsorption tower and enter the adsorption tower T0301C, which has completed the step of backward discharge BD in this section, to rise the pressure, so that the two towers have the same pressure as much as possible.

(3) Backward Discharge BD

After the pressure-equalizing drop ED of the adsorption tower T0301A is finished, program-controlled valves KV4A-3 and KV31 are opened; a gas in the adsorption tower T0301A is fed into the backward discharge buffer tank (V0302) backwards; and after the pressure of the adsorption tower T0301A is close to that of the backward discharge buffer tank (V0302), the program-controlled valve KV31 is closed, and then the program-controlled valve KV21 is opened.

(4) Pressure-Equalizing Rise ER

After the backward discharge BD of the adsorption tower T0301A is finished, program-controlled valves KV3A-3 and KV3B-3 are opened; a gas discharged in the step of pressure-equalizing drop ED of an adsorption tower T0301B enters into the adsorption tower from the outlet of the adsorption tower T0301A, to rise the pressure of the adsorption tower T0301A, so that the adsorption towers T0301A and T0301B have the same pressure as much as possible.

(5) Final Pressure Rise FR

After the pressure-equalizing rise ER is finished, the program-controlled valve KV3A-3 is closed, and the program-controlled valve KV2A-3 is opened; and the outlet gas in the adsorption step is used for boosting the adsorption tower T0301A until the pressure is close to the adsorption pressure of the third PSA section.

After the above steps, the adsorption tower T0301A completes one cycle and is prepared for the raw gas adsorption again; and the operation of other adsorption towers in this PSA section are exactly the same as that of the adsorption tower T0301A, except that they are staggered operation.

Results of the present Example show that the concentration of oxygen in the product is greater than or equal to 99.5% (V), the pressure is greater than or equal to 1.0 MPa, and the cost of using oxygen is 45% lower than that of bottled oxygen.

Example 9

Figure 14:
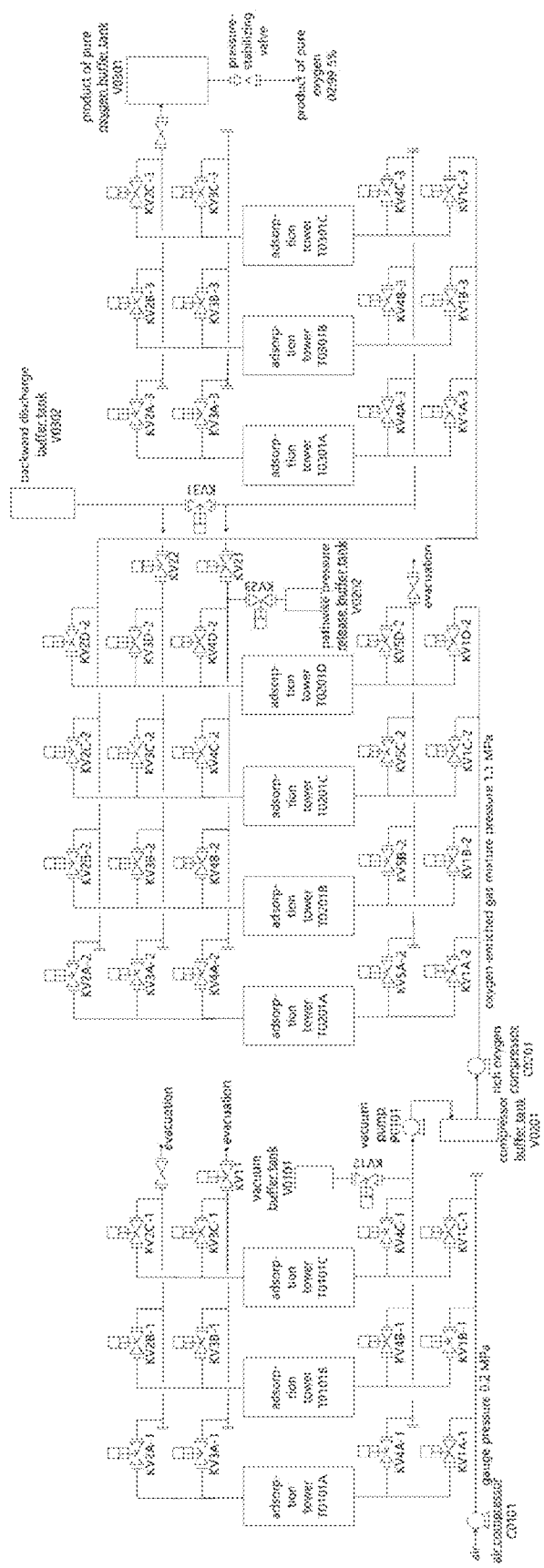
FIG. 14 is a process flow chart of Example 9 of the present disclosure.

FIG. 17 is a diagram showing operation steps of adsorption towers of various sections and switching sequence of program-controlled valves in Example 9 of the present disclosure. FIG. 14 is a process flow chart of Example 9 of the present disclosure.

Composition of raw air in the present Example is as follows:

| Component | $O_2$ | $N_2$ | Ar | $CO_2$ | Others | Σ |
|---|---|---|---|---|---|---|
| Concentration(%)(V) | 20.93 | 78.03 | 0.932 | 0.03 | 0.078 | 100 |

Temperature: ≤40° C.
Pressure: 0.2 MPa (G)

As shown in FIG. 14, an air compressor C0101, a vacuum buffer tank V0101, a vacuum pump P0101, program-controlled valves, a PLC control system, instruments, pipe fittings and adsorption towers T0101A, T0101B and T0101C form the first PSA section; adsorbents charged in the adsorption towers from bottom to top are activated alumina and carbon molecular sieves in turn; in the first PSA section, single tower adsorption, pressure equalization and vacuumizing steps are run. A rich oxygen compressor C0201, a compressor buffer tank V0201, a pathwise pressure release buffer tank V0202, program-controlled valves, a PLC control system, instruments, pipe fittings and adsorption towers T0201A, T0201B, T0201C and T0201D form the second PSA section; adsorbents charged in the adsorption towers from bottom to top are activated alumina, and 5-type molecular sieves or X-type lithium molecular sieves in turn; in the second PSA section, single tower adsorption, pressure equalization, pathwise pressure release, backward discharge, pathwise pressure release gas purging, third-section desorption gas purging, third-section desorption gas pressure rise and final pressure rise steps are run. A product of pure oxygen buffer tank V0301, a backward discharge buffer tank V0302, program-controlled valves, a PLC control system, instruments, pipe fittings, a pressure-stabilizing valve, adsorption towers T0301A, T0301B and T0301C form the third PSA section; adsorbents charged in the adsorption towers are 5-type molecular sieves or X-type lithium molecular sieves; in the third PSA section, single tower adsorption, pressure equalization, backward discharge and final pressure rise step are run. In the present Example, the above three PSA sections are operated in series; the first PSA section adsorbs gaseous water, carbon dioxide and oxygen in the air; the second PSA section is used for adsorbing the gaseous water, carbon dioxide and nitrogen desorbed by the first PSA section, and increasing the concentration of oxygen to about 85-96% (V); and the third PSA section is used for adsorbing nitrogen from a gas mixture flowing out the adsorption tower of the second PSA section in the step of adsorption A and having a concentration of oxygen of 85-96% (V), and increasing the concentration of oxygen to above 99.5% (V).

The raw air is boosted to 0.2 MPa (G) by the air compressor (C0101) and enters into the adsorption tower of the first PSA section so as to implement the step of adsorption; the adsorbent in the adsorption tower selectively and sequentially adsorbs gaseous water, carbon dioxide, oxygen etc. in the air; and the unadsorbed oxygen, and less easily adsorbed components such as nitrogen and argon are discharged from an outlet and evacuated. After the adsorption of the adsorption tower of the first PSA section is finished, vacuumizing is carried out after pressure equalization; gaseous water, carbon dioxide, oxygen and nitrogen pumped out by the vacuum pump are compressed to 1.2 MPa by the compressor buffer tank (V0201) and the rich oxygen compressor (C0201) and then enter into the adsorption tower of the second PSA section so as to implement the step of adsorption; the adsorbent in the adsorption tower selectively and sequentially adsorbs gaseous water, carbon dioxide and nitrogen in the oxygen-enriched gas mixture; and less easily adsorbed components such as oxygen and argon flow out from the outlet and enter into the adsorption tower of the third PSA section so as to implement the step of adsorption. The adsorbent in the adsorption tower further adsorbs the nitrogen in the oxygen-enriched gas mixture; and less easily adsorbed components such as oxygen and argon flow out from the outlet and enter into the product of pure oxygen buffer tank (V0301). After the adsorption of the adsorption tower of the first PSA section is finished, the concentration of oxygen in the outlet gas is controlled at 7-12% (V); and the adsorption tower of the first PSA section sequentially undergoes PSA steps of adsorption A, pressure-equalizing drop ED, vacuumizing VC and pressure-equalizing rise ER in one cycle. The concentration of oxygen in the outlet gas of the adsorption tower of the second PSA section in the step of adsorption is controlled at about 85-96% (V); and the adsorption tower sequentially undergoes the PSA steps of adsorption A, pressure-equalizing drop ED, pathwise pressure release PP, backward discharge BD, pathwise pressure release gas purging P, third-section desorption gas purging P3, third-section desorption gas pressure rise R3, pressure-equalizing rise ER and final pressure rise FR in one cycle. The concentration of oxygen in the outlet gas of the adsorption tower of the third PSA section in the adsorption step is controlled above 99.5% (V); and the adsorption tower sequentially undergoes the PSA steps of adsorption A, pressure-equalizing drop ED, backward discharge BD, pressure-equalizing rise ER and final pressure rise FR in one cycle. A total recovery rate of oxygen is about 85%; the concentration of oxygen in the vacuum desorption gas of the first section is about 80%; the circulation time of the adsorption tower of each PSA section is generally 20-80 seconds; the vacuum degree of the first section is −0.095 MPa; and the air volume of the compressor, the superficial velocity of the adsorption towers of each PSA section, the pumping volume of the vacuum pump, the amount of used adsorbent, the diameter of the adsorption tower and other design parameters are designed according to general conditions in the technical field of PSA.

Each adsorption tower in the present disclosure sequentially undergoes the following steps in one cycle.

The adsorption tower of the first PSA section sequentially undergoes the same steps and switching sequence of program-controlled valves in one cycle as that of the first PSA section in Example 2.

Second PSA Section (1) Adsorption A

A program-controlled valve KV1A-2 of the second PSA section is opened; the oxygen-enriched gas mixture pumped out in the step of vacuumizing (VC) of the adsorption tower of the first PSA section is fed into the compressor buffer tank (V0201), is compressed to 1.2 MPa by a rich oxygen compressor (C0201), and then enters into an adsorbent bed of an adsorption tower T0201A; an adsorbent in the adsorption tower T0201A selectively and sequentially adsorbs gaseous water, carbon dioxide, nitrogen etc. in the oxygen-enriched gas mixture; the unadsorbed nitrogen, and less easily adsorbed components such as oxygen and argon flow out from the outlet into the adsorption tower of the third PSA section so as to implement the step of adsorption by opening the program-controlled valve KV2A-2; with the passage of time, the total amount of gaseous water, carbon dioxide, nitrogen etc. adsorbed by the adsorbent is continuously increasing; and when the gaseous water, carbon dioxide and nitrogen adsorbed by the adsorption tower T0201A is saturated, the air intake is stopped, and the adsorption is finished.

(2) Pressure-Equalizing Drop ED

After the adsorption A is finished, program-controlled valves KV3A-2 and KV3C-2 are opened; and a dead space gas in the adsorption tower T0201A will be discharged from the outlet of the adsorption tower and enter into the adsorption tower T0201C, which has completed the step of third-section desorption gas pressure rise R3 in this section, to rise the pressure, so that the two towers have the same pressure as much as possible.

(3) Pathwise Pressure Release PP

After the pressure-equalizing drop ED is finished, program-controlled valves KV4A-2 and KV23 are opened; a dead space gas in the adsorption tower T0101A will be discharged from an outlet of the adsorption tower and enter into a pathwise pressure release buffer tank (V0202); and when the pressure drops to 0.38-0.42 MPa (G), the program-controlled valves KV4A-2 and KV23 are closed, and the pathwise pressure release PP is finished.

(4) Backward Discharge BD

After the pathwise pressure release PP of the adsorption tower T0201A is finished, a program-controlled valve KV5A-2 is opened to evacuate the gas in the adsorption tower T0201A backwards until the pressure is close to a normal pressure.

(5) Pathwise Pressure Release Gas Purging P

After the backward discharge BD of the adsorption tower T0201A is finished, program-controlled valves KV4A-2 and KV23 are opened; a gas mixture in the pathwise pressure release buffer tank (V0202) enters into the adsorption tower from the outlet of the adsorption tower T0201A through the program-controlled valve KV4A-2, and then is discharged from the bottom of the adsorption tower T0201A through the program-controlled valve KV5A-2 and evacuated; and after the pathwise pressure release gas purging P is finished, KV23 is closed.

(6) Third-Section Desorption Gas Purging P3

After the pathwise pressure release gas purging P of the adsorption tower T0201A is finished, KV21 is opened; and a gas mixture desorbed in later period of the step of backward discharge BD of the adsorption tower of the third PSA section enters into the adsorption tower from the outlet of the adsorption tower T0201A through the program-controlled valve KV4A-2, and then is discharged from the bottom of the adsorption tower T0201A through the program-controlled valve KV5A-2 and evacuated.

(7) Third-Section Desorption Gas Pressure Rise R3

After the third-section desorption gas purging P3 of the adsorption tower T0201A is finished, program-controlled valves KV3A-2 and KV22 are opened; a gas mixture of the backward discharge buffer tank (V0302) enters into the adsorption tower T0201A from the outlet of the adsorption tower T0201A through the program-controlled valve KV3A-2, to rise the pressure until the adsorption tower T0201A has the same pressure as the backward discharge buffer tank (V0302).

(8) Pressure-Equalizing Rise ER

After the third-section desorption gas pressure rise R3 of the adsorption tower T0201A is finished, program-controlled valves KV3A-2 and KV3C-2 are opened; a gas discharged in the step of pressure-equalizing drop ED of the adsorption tower T0201C enters into the adsorption tower from the outlet of the adsorption tower T0201A, to rise the pressure of the adsorption tower T0201A until the adsorption towers T0201A and T0201C have the same pressure.

(9) Final Pressure Rise FR

After the pressure-equalizing rise ER is finished, the program-controlled valve KV3A-2 is closed, and the program-controlled valve KV2A-2 is opened; and the outlet gas in the adsorption step is used for boosting the adsorption tower T0201A until the pressure is close to the adsorption pressure of the second PSA section.

After the above steps, the adsorption tower T0201A completes one cycle and is prepared for the raw gas adsorption again; and the operation of other adsorption towers in this PSA section are exactly the same as that of the adsorption tower T0201A, except that they are staggered operation.

The adsorption tower of the third PSA section sequentially undergoes the same steps and switching sequence of program-controlled valves in one cycle as that of the third PSA section in Example 8.

Results of the present Example show that the concentration of oxygen in the product is greater than or equal to 99.5% (V), the pressure is greater than or equal to 1.0 MPa, and the cost of using oxygen is 50% lower than that of bottled oxygen.

Example 10

FIG. 19 is a diagram showing operation steps of adsorption towers of various sections and switching sequence of program-controlled valves in Example 10 of the present disclosure.

Figure 16:
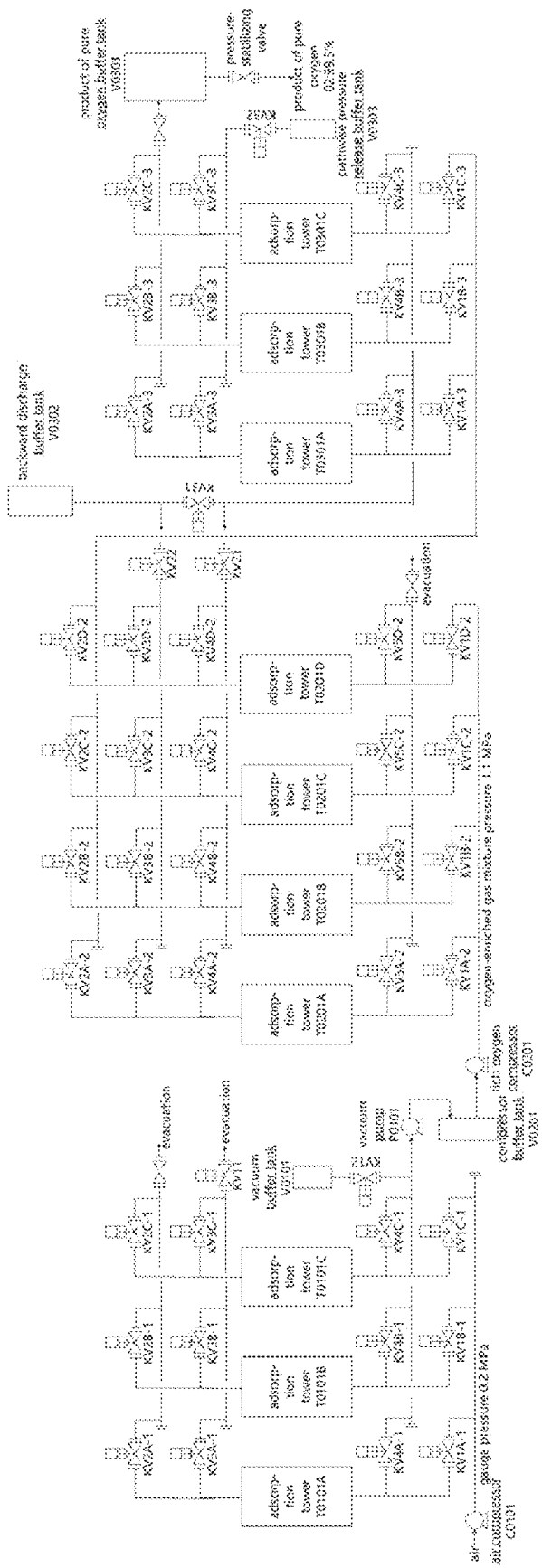
FIG. 16 is a process flow chart of Example 10 of the present disclosure.

FIG. 16 is a process flow chart of Example 10 of the present disclosure.

Composition of raw air in the present Example is as follows:

| Component | $O_2$ | $N_2$ | Ar | $CO_2$ | Others | Σ |
|---|---|---|---|---|---|---|
| Concentration(%)(V) | 20.93 | 78.03 | 0.932 | 0.03 | 0.078 | 100 |

Temperature: ≤40° C.
Pressure: 0.2 MPa (G)

As shown in FIG. 16, an air compressor C0101, a vacuum buffer tank V0101, a vacuum pump P0101, program-controlled valves, a PLC control system, instruments, pipe fittings and adsorption towers T0101A, T0101B and T0101C form the first PSA section; adsorbents charged in the adsorption towers from bottom to top are activated alumina and carbon molecular sieves in turn; in the first PSA section, single tower adsorption, pressure equalization and vacuumizing steps are run. A rich oxygen compressor C0201, a compressor buffer tank V0201, program-controlled valves, a PLC control system, instruments, pipe fittings and adsorption towers T0201A, T0201B, T0201C and T0201D form the second PSA section; adsorbents charged in the adsorption towers from bottom to top are activated alumina, and 5-type molecular sieves or X-type lithium molecular sieves in turn; in the second PSA section, single tower adsorption, pressure equalization, backward discharge, third-section desorption gas purging, third-section desorption gas pressure rise and final pressure rise steps are run. A product of pure oxygen buffer tank V0301, a backward discharge buffer tank V0302, a pathwise pressure release buffer tank V0303, program-controlled valves, a PLC control system, instruments, pipe fittings, a pressure-stabilizing valve, adsorption towers T0301A, T0301B and T0301C form the third PSA section; adsorbents charged in the adsorption towers are 5-type molecular sieves or X-type lithium molecular sieves; in the third PSA section, single tower adsorption, pressure equalization, pathwise pressure release, backward discharge, purging and final pressure rise steps are run. In the present Example, the above three PSA sections are operated in series; the first PSA section adsorbs gaseous water, carbon dioxide and oxygen in the air; the second PSA section is used for adsorbing the gaseous water, carbon dioxide and nitrogen desorbed by the first PSA section, and increasing the concentration of oxygen to about 85-96% (V); and the third PSA section is used for adsorbing nitrogen from a gas mixture flowing out from the adsorption tower of the second PSA section in the step of adsorption of and having a concentration of oxygen of 85-96% (V), and increasing the concentration of oxygen to above 99.5% (V).

The raw air is boosted to 0.2 MPa (G) by the air compressor (C0101) and enters into the adsorption tower of the first PSA section so as to implement the step of adsorption; the adsorbent in the adsorption tower selectively and sequentially adsorbs gaseous water, carbon dioxide, oxygen etc. in the air; and the unadsorbed oxygen, and less easily adsorbed components such as nitrogen and argon are discharged from an outlet and evacuated. After the adsorption of the adsorption tower of the first PSA section is finished, vacuumizing is carried out after pressure equalization; gaseous water, carbon dioxide, oxygen and nitrogen pumped out by the vacuum pump are compressed to 1.2 MPa by the compressor buffer tank (V0201) and the rich oxygen compressor (C0201) and then enter into the adsorption tower of the second PSA section so as to implement the step of adsorption; the adsorbent in the adsorption tower selectively and sequentially adsorbs gaseous water, carbon dioxide and nitrogen in the oxygen-enriched gas mixture; and less easily adsorbed components such as oxygen and argon flow out from the outlet end and enter into the adsorption tower of the third PSA section so as to implement the step of adsorption. The adsorbent in the adsorption tower further adsorbs the nitrogen in the oxygen-enriched gas mixture; and less easily adsorbed components such as oxygen and argon flow out from the outlet and enter into the product of pure oxygen buffer tank (V0301). After the adsorption of the adsorption tower of the first PSA section is finished, the concentration of oxygen in the outlet gas is controlled at 7-12% (V); and the adsorption tower of the first PSA section sequentially undergoes PSA steps of adsorption A, pressure-equalizing drop ED, vacuumizing VC and pressure-equalizing rise ER in one cycle. The concentration of oxygen in the outlet gas of the adsorption tower of the second PSA section in the step of adsorption is controlled at about 85-96% (V); and the adsorption tower sequentially undergoes the PSA steps of adsorption A, pressure-equalizing drop ED, backward discharge BD, third-section desorption gas purging P3, third-section desorption gas pressure rise R3, pressure-equalizing rise ER and final pressure rise FR in one cycle. The concentration of oxygen in the outlet gas of the adsorption tower of the third PSA section in the adsorption step is controlled above 99.5% (V); and the adsorption tower sequentially undergoes the PSA steps of adsorption A, pressure-equalizing drop ED, pathwise pressure release PP, backward discharge BD, purging P, pressure-equalizing rise ER and final pressure rise FR in one cycle. A total recovery rate of oxygen is about 85%; the concentration of oxygen in the vacuum desorption gas of the first section is about 80%; the circulation time of the adsorption tower of each PSA section is generally 20-80 seconds; the vacuum degree of the first section is −0.095 MPa; and the air volume of the compressor, the superficial velocity of the adsorption towers of each PSA section, the pumping volume of the vacuum pump, the amount of used adsorbent, the diameter of the adsorption tower and other design parameters are designed according to general conditions in the technical field of PSA. Each adsorption tower in the present disclosure sequentially undergoes the following steps in one cycle.

The adsorption tower of the first PSA section sequentially undergoes the same steps and switching sequence of program-controlled valves in one cycle as that of the first PSA section in Example 2.

The adsorption tower of the second PSA section sequentially undergoes the same steps and switching sequence of program-controlled valves in one cycle as that of the second PSA section in Example 8.

Third PSA Section (1) Adsorption A

Program-controlled valves KV1A-3 and KV1A-3 of the third PSA section are opened; the oxygen-enriched gas mixture having a concentration of oxygen of 85-96% (V) in the step of adsorption A of the adsorption tower of the second PSA section enters into from the bottom of the adsorption tower of the third PSA section; an adsorbent in the adsorption tower further adsorbs nitrogen in the oxygen-enriched gas mixture; and the less easily adsorbed components such as oxygen and argon flow out from the outlet end into a product of pure oxygen buffer tank (V0301). With the passage of time, the total amount of nitrogen adsorbed by the adsorbent is continuously increasing; and when the nitrogen adsorbed by the adsorption tower T0301A is saturated, the air intake is stopped, and the adsorption is finished.

(2) Pressure-Equalizing Drop ED

After the adsorption A is finished, program-controlled valves KV3A-3 and KV3C-3 are opened; and a dead space gas in the adsorption tower T0301A will be discharged from the outlet of the adsorption tower and enter into the adsorption tower T0301C, which has completed the step of purging P in this section, to rise the pressure, so that the two towers have the same pressure as much as possible.

(3) Pathwise Pressure Release PP

After the pressure-equalizing drop ED is finished, the program-controlled valve KV3C-3 is closed, and the program-controlled valve KV32 is opened; a dead space gas in the adsorption tower T0301A will be discharged from an outlet of the adsorption tower and enter into a pathwise pressure release buffer tank (V0303); and when the pressure drops to 0.38-0.42 MPa (G), the program-controlled valves KV3A-3 and KV32 are closed, and the pathwise pressure release PP is finished.

(4) Backward Discharge BD

After the pathwise pressure release PP of the adsorption tower T0301A is finished, a program-controlled valve KV4A-3 is opened to evacuate the gas in the adsorption tower T0301A backwards until the pressure is close to a normal pressure.

(5) Pathwise Pressure Release Gas Purging P

After the backward discharge BD of the adsorption tower T0301A is finished, the program-controlled valves KV3A-3 and KV32 are opened; a gas mixture in the pathwise pressure release buffer tank (V0303) enters into the adsorption tower from the outlet of the adsorption tower T0301A through the program-controlled valve KV3A-3, and then is discharged from the bottom of the adsorption tower T0301A through the program-controlled valve KV4A-3 and evacuated; and after the pathwise pressure release gas purging P is finished, KV32 is closed.

(6) Pressure-Equalizing Rise ER

After the pathwise pressure release gas purging P of the adsorption tower T0301A is finished, program-controlled valves KV3A-3 and KV3B-3 are opened; a gas discharged in the step of pressure-equalizing drop ED of an adsorption tower T0301B enters into the adsorption tower from the outlet of the adsorption tower T0301A, to rise the pressure of the adsorption tower T0301A until the adsorption towers T0301A and T0301C have the same pressure.

(7) Final Pressure Rise FR

After the pressure-equalizing rise ER is finished, the program-controlled valve KV3A-3 is closed, and the program-controlled valve KV2A-3 is opened; and the outlet gas in the adsorption step is used for boosting the adsorption tower T0301A until the pressure is close to the adsorption pressure of the third PSA section.

After the above steps, the adsorption tower T0301A completes one cycle and is prepared for the raw gas adsorption again; and the operation of other adsorption towers in this PSA section are exactly the same as that of the adsorption tower T0301A, except that they are staggered operation.

Results of the present Example show that the concentration of oxygen in the product is greater than or equal to 99.5% (V), the pressure is greater than or equal to 1.0 MPa, and the cost of using oxygen is 55% lower than that of bottled oxygen.

Example 11

FIG. 21 is a diagram showing operation steps of adsorption towers of various sections and switching sequence of program-controlled valves in Example 11 of the present disclosure.

Figure 18:
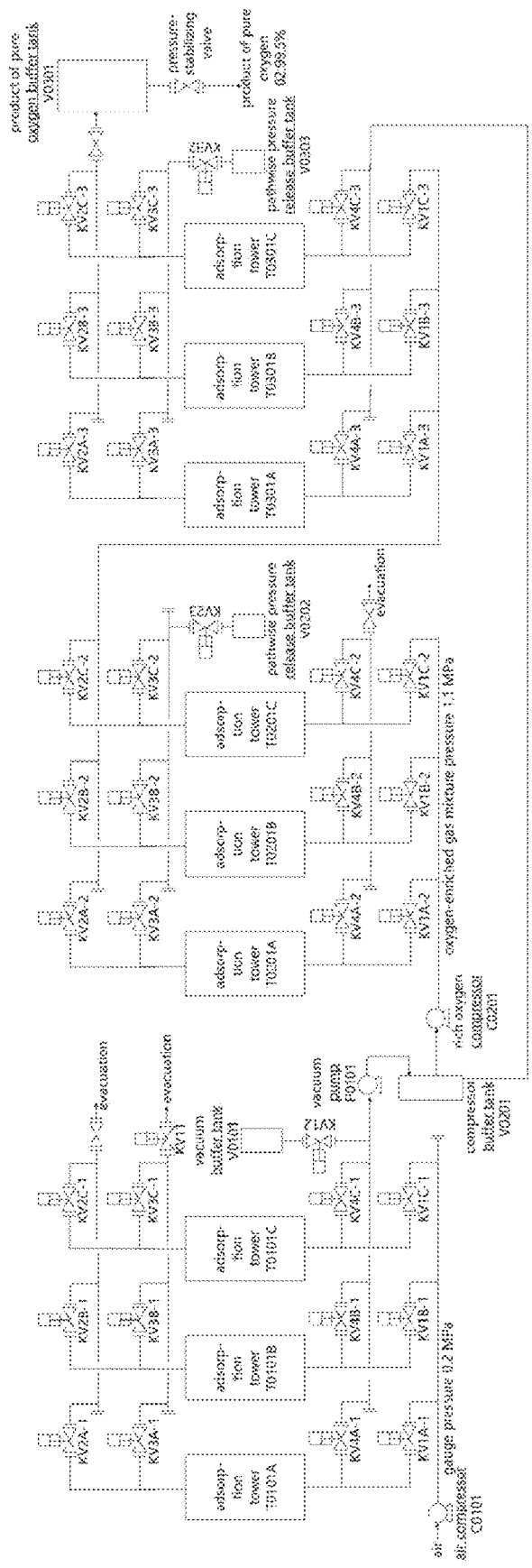
FIG. 18 is a process flow chart of Example 11 of the present disclosure.

FIG. 18 is a process flow chart of Example 11 of the present disclosure.

Composition of raw air in the present Example is as follows:

| Component | $O_2$ | $N_2$ | Ar | $CO_2$ | Others | Σ |
|---|---|---|---|---|---|---|
| Concentration(%)(V) | 20.93 | 78.03 | 0.932 | 0.03 | 0.078 | 100 |

Temperature: ≤40° C.
Pressure: 0.2 MPa (G)

As shown in FIG. 18, an air compressor C0101, a vacuum buffer tank V0101, a vacuum pump P0101, program-controlled valves, a PLC control system, instruments, pipe fittings and adsorption towers T0101A, T0101B and T0101C form the first PSA section; adsorbents charged in the adsorption towers from bottom to top are activated alumina and carbon molecular sieves in turn; in the first PSA section, single tower adsorption, pressure equalization and vacuumizing steps are run. A rich oxygen compressor C0201, a compressor buffer tank V0201, a pathwise pressure release buffer tank V0202, program-controlled valves, a PLC control system, instruments, pipe fittings and adsorption towers T0201A, T0201B and T0201C form the second PSA section; adsorbents charged in the adsorption towers from bottom to top are activated alumina, and 5-type molecular sieves or X-type lithium molecular sieves in turn; in the second PSA section, single tower adsorption, pressure equalization, pathwise pressure release, backward discharge, purging and final pressure rise steps are run. A product of pure oxygen buffer tank V0301, a pathwise pressure release buffer tank V0303, program-controlled valves, a PLC control system, instruments, pipe fittings, a pressure-stabilizing valve, adsorption towers T0301A, T0301B and T0301C form the third PSA section; adsorbents charged in the adsorption towers are 5-type molecular sieves or X-type lithium molecular sieves; in the third PSA section, single tower adsorption, pressure equalization, pathwise pressure release, backward discharge, purging and final pressure rise steps are run. In the present Example, the above three PSA sections are operated in series; the first PSA section adsorbs gaseous water, carbon dioxide and oxygen in the air; the second PSA section is used for adsorbing the gaseous water, carbon dioxide and nitrogen desorbed by the first PSA section, and increasing the concentration of oxygen to about 85-96% (V); and the third PSA section is used for adsorbing nitrogen from a gas mixture flowing out from the adsorption tower of the second PSA section in the step of adsorption A of and having a concentration of oxygen of 85-96% (V), and increasing the concentration of oxygen to above 99.5% (V).

The raw air is boosted to 0.2 MPa (G) by the air compressor (C0101) and enters into the adsorption tower of the first PSA section so as to implement the step of adsorption; the adsorbent in the adsorption tower selectively and sequentially adsorbs gaseous water, carbon dioxide, oxygen etc. in the air; and the unadsorbed oxygen, and less easily adsorbed components such as nitrogen and argon are discharged from an outlet and evacuated. After the adsorption of the adsorption tower of the first PSA section is finished, vacuumizing is carried out after pressure equalization; gaseous water, carbon dioxide, oxygen and nitrogen pumped out by the vacuum pump are compressed to 1.2 MPa by the compressor buffer tank (V0201) and the rich oxygen compressor (C0201) and then enter into the adsorption tower of the second PSA section so as to implement the step of adsorption; the adsorbent in the adsorption tower selectively and sequentially adsorbs gaseous water, carbon dioxide and nitrogen in the oxygen-enriched gas mixture; and less easily adsorbed components such as oxygen and argon flow out from the outlet and enter into the adsorption tower of the third PSA section so as to implement the step of adsorption. The adsorbent in the adsorption tower further adsorbs the nitrogen in the oxygen-enriched gas mixture; and less easily adsorbed components such as oxygen and argon flow out from the outlet and enter the product of pure oxygen buffer tank (V0301). After the adsorption of the adsorption tower of the first PSA section is finished, the concentration of oxygen in the outlet gas is controlled at 7-12% (V); and the adsorption tower of the first PSA section sequentially undergoes PSA steps of adsorption A, pressure-equalizing drop ED, vacuumizing VC and pressure-equalizing rise ER in one cycle. The concentration of oxygen in the outlet gas of the adsorption tower of the second PSA section in the step of adsorption is controlled at about 85-96% (V); and the adsorption tower sequentially undergoes the PSA steps of adsorption A, pressure-equalizing drop ED, pathwise pressure release PP, backward discharge BD, purging P, pressure-equalizing rise ER and final pressure rise FR in one cycle. The concentration of oxygen in the outlet gas of the adsorption tower of the third PSA section in the adsorption step is controlled above 99.5% (V); the adsorption tower sequentially undergoes the PSA steps of adsorption A, pressure-equalizing drop ED, pathwise pressure release PP, backward discharge BD, purging P, pressure-equalizing rise ER and final pressure rise FR in one cycle; and gases desorbed by the adsorption tower of the third PSA section in steps of backward discharge BD and during P are all returned to the compressor buffer tank V0201. A total recovery rate of oxygen is about 85%; the concentration of oxygen in the vacuum desorption gas of the first section is about 80%; the circulation time of the adsorption tower of each PSA section is generally 20-80 seconds; the vacuum degree of the first section is −0.095 MPa; and the air volume of the compressor, the superficial velocity of the adsorption towers of each PSA section, the pumping volume of the vacuum pump, the amount of used adsorbent, the diameter of the adsorption tower and other design parameters are designed according to general conditions in the technical field of PSA.

Each adsorption tower in the present disclosure sequentially undergoes the following steps in one cycle.

The adsorption tower of the first PSA section sequentially undergoes the same steps and switching sequence of program-controlled valves in one cycle as that of the first PSA section in Example 2.

Second PSA Section (1) Adsorption A

A program-controlled valve KV1A-2 of the second PSA section is opened; the oxygen-enriched gas mixture pumped out in the step of vacuumizing (VC) of the adsorption tower of the first PSA section is fed into the compressor buffer tank (V0201), is compressed to 1.2 MPa by a rich oxygen compressor (C0201), and then enters into an adsorbent bed of an adsorption tower T0201A; an adsorbent in the adsorption tower T0201A selectively and sequentially adsorbs gaseous water, carbon dioxide, nitrogen etc. in the oxygen-enriched gas mixture; the unadsorbed nitrogen, and less easily adsorbed components such as oxygen and argon flow out from the outlet into the adsorption tower of the third PSA section in the step of adsorption by opening the program-controlled valve KV2A-2; with the passage of time, the total amount of gaseous water, carbon dioxide, nitrogen and other components adsorbed by the adsorbent is continuously increasing; and when the gaseous water, carbon dioxide and nitrogen adsorbed by the adsorption tower T0201A is saturated, the air intake is stopped, and the adsorption is finished.

(2) Pressure-Equalizing Drop ED

After the adsorption A is finished, program-controlled valves KV3A-2 and KV3C-2 are opened; and a dead space gas in the adsorption tower T0201A will be discharged from the outlet of the adsorption tower and enter into the adsorption tower T0201C, which has completed the step of purging P in this section, to rise the pressure, so that the two towers have the same pressure as much as possible.

(3) Pathwise Pressure Release PP

After the pressure-equalizing drop ED is finished, the program-controlled valve KV3C-2 is closed, and a program-controlled valve KV23 is opened; a dead space gas in the adsorption tower T0201A will be discharged from an outlet of the adsorption tower and enter into a pathwise pressure release buffer tank (V0202); and when the pressure drops to 0.38-0.42 MPa (G), the program-controlled valves KV3A-2 and KV23 are closed, and the pathwise pressure release PP is finished.

(4) Backward Discharge BD

After the pathwise pressure release PP of the adsorption tower T0201A is finished, a program-controlled valve KV4A-2 is opened to evacuate the gas in the adsorption tower T0201A backwards until the pressure is close to a normal pressure.

(5) Pathwise Pressure Release Gas Purging P

After the backward discharge BD of the adsorption tower T0201A is finished, program-controlled valves KV3A-2 and KV23 are opened; a gas mixture in the pathwise pressure release buffer tank (V0202) enters into the adsorption tower from the outlet of the adsorption tower T0201A through the program-controlled valve KV3A-2, and then is discharged from the bottom of the adsorption tower T0201A through the program-controlled valve KV4A-2 and evacuated; and after the pathwise pressure release gas purging P is finished, KV23 is closed.

(6) Pressure-Equalizing Rise ER

After the pathwise pressure release gas purging P of the adsorption tower T0201A is finished, program-controlled valves KV3A-2 and KV3B-2 are opened; a gas discharged in the step of pressure-equalizing drop ED of an adsorption tower T0201B enters into the adsorption tower from the outlet of the adsorption tower T0201A, to rise the pressure of the adsorption tower T0201A until the adsorption towers T0201A and T0201C have the same pressure.

(7) Final Pressure Rise FR

After the pressure-equalizing rise ER is finished, the program-controlled valve KV3A-2 is closed, and the program-controlled valve KV2A-2 is opened; and the outlet gas in the adsorption step is used for boosting the adsorption tower T0201A until the pressure is close to the adsorption pressure of the third PSA section.

After the above steps, the adsorption tower T0201A completes one cycle and is prepared for the raw gas adsorption again; and the operation of other adsorption towers in this PSA section are exactly the same as that of the adsorption tower T0201A, except that they are staggered operation.

The adsorption tower of the third PSA section sequentially undergoes the same steps and switching sequence of program-controlled valves in one cycle as that of the third PSA section in Example 10.

Results of the present Example show that the concentration of oxygen in the product is greater than or equal to 99.5% (V), the pressure is greater than or equal to 1.0 MPa, and the cost of using oxygen is 55% lower than that of bottled oxygen.

Example 12

FIG. 22 is a diagram showing operation steps of adsorption towers of various sections and switching sequence of program-controlled valves in Example 12 of the present disclosure.

Figure 20:
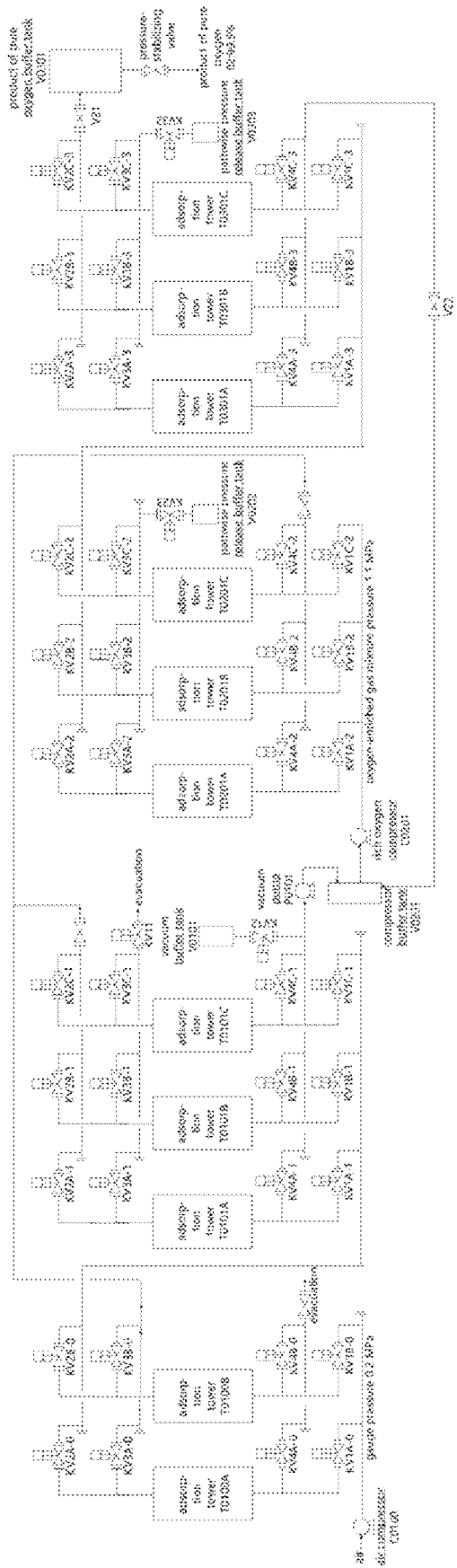
FIG. 20 is a process flow chart of Example 12 of the present disclosure.

FIG. 20 is a process flow chart of Example 12 of the present disclosure.

Composition of raw air in the present Example is as follows:

| Component | $O_2$ | $N_2$ | Ar | $CO_2$ | Others | Σ |
|---|---|---|---|---|---|---|
| Concentration(%)(V) | 20.93 | 78.03 | 0.932 | 0.03 | 0.078 | 100 |

Temperature: ≤40° C.
Pressure: 0.2 MPa (G)

As shown in FIG. 20, an air compressor C0100, program-controlled valves, a PLC control system, instruments, pipe fittings and adsorption towers T0101A and T0101B form a PSA drying section; adsorbents charged in the adsorption towers are activated alumina; in the PSA dying section, single tower adsorption and purging steps are run. A vacuum buffer tank V0101, a vacuum pump P0101, program-controlled valves, a PLC control system, instruments, pipe fittings and adsorption towers T0101A, T0101B and T0101C form the first PSA section; adsorbents charged in the adsorption towers are carbon molecular sieves; in the first PSA section, single tower adsorption, pressure equalization and vacuumizing steps are run. A rich oxygen compressor C0201, a compressor buffer tank V0201, a pathwise pressure release buffer tank V0202, program-controlled valves, a PLC control system, instruments, pipe fittings and adsorption towers T0201A, T0201B and T0201C form the second PSA section; adsorbents charged in the adsorption towers are 5-type molecular sieves or X-type lithium molecular sieves; in the second PSA section, single tower adsorption, pressure equalization, pathwise pressure release, backward discharge, purging and final pressure rise steps are run. A product of pure oxygen buffer tank V0301, a pathwise pressure release buffer tank V0303, program-controlled valves, a PLC control system, instruments, pipe fittings, a pressure-stabilizing valve, adsorption towers T0301A, T0301B and T0301C form the third PSA section; adsorbents charged in the adsorption towers are 5-type molecular sieves or X-type lithium molecular sieves; in the third PSA section, single tower adsorption, pressure equalization, pathwise pressure release, backward discharge, purging and final pressure rise steps are run. In the present Example, the above four PSA sections are operated in series; the PSA drying section adsorbs gaseous water in the air; the first PSA section adsorbs carbon dioxide and oxygen in the air; the second PSA section is used for adsorbing the carbon dioxide and nitrogen desorbed by the first PSA section, and increasing the concentration of oxygen to about 85-96% (V); and the third PSA section is used for adsorbing nitrogen from a gas mixture flowing out in the step of adsorption A of the adsorption tower of the second PSA section and having a concentration of oxygen of 85-96% (V), and increasing the concentration of oxygen to above 99.5% (V).

The raw air is boosted to 0.2 MPa (G) by the air compressor (C0100) and enters into from the bottom of the adsorption tower of the PSA drying section; the adsorbent in the adsorption tower selectively and sequentially adsorbs gaseous water in the air; less easily adsorbed components such as oxygen, nitrogen and argon are discharged from an outlet and then enter into the adsorption tower of the first PSA section so as to implement the step of adsorption; the adsorbent in the adsorption tower selectively adsorbs carbon dioxide and oxygen; and the unadsorbed oxygen, and less easily adsorbed components such as nitrogen and argon are discharged from an outlet and evacuated. After the adsorption of the adsorption tower of the first PSA section is finished, vacuumizing is carried out after pressure equalization; carbon dioxide, oxygen and nitrogen pumped out by the vacuum pump are compressed to 1.2 MPa by the compressor buffer tank (V0201) and the rich oxygen compressor (C0201) and then enter into the adsorption tower of the second PSA section so as to implement the step of adsorption; the adsorbent in the adsorption tower selectively adsorbs nitrogen in the oxygen-enriched gas mixture; and less easily adsorbed components such as oxygen and argon flow out from the outlet and enter into the adsorption tower of the third PSA section so as to implement the step of adsorption. The adsorbent in the adsorption tower further adsorbs the nitrogen in the oxygen-enriched gas mixture;

and less easily adsorbed components such as oxygen and argon flow out from the outlet and enter into the product of pure oxygen buffer tank (V0301). After the adsorption of the adsorption tower of the first PSA section is finished, the concentration of oxygen in the outlet gas is controlled at 7-12% (V); and the adsorption tower of the first PSA section sequentially undergoes PSA steps of adsorption A, pressure-equalizing drop ED, vacuumizing VC and pressure-equalizing rise ER in one cycle. The concentration of oxygen in the outlet gas of the adsorption tower of the second PSA section in the step of adsorption is controlled at about 85-96% (V); and the adsorption tower sequentially undergoes the PSA steps of adsorption A, pressure-equalizing drop ED, pathwise pressure release PP, backward discharge BD, purging P, pressure-equalizing rise ER and final pressure rise FR in one cycle. The concentration of oxygen in the outlet gas of the adsorption tower of the third PSA section in the adsorption step is controlled above 99.5% (V); the adsorption tower sequentially undergoes the PSA steps of adsorption A, pressure-equalizing drop ED, pathwise pressure release PP, backward discharge BD, purging P, pressure-equalizing rise ER and final pressure rise FR in one cycle; and gases desorbed by the adsorption tower of the third PSA section in steps of backward discharge BD and puring P are all returned to the compressor buffer tank V0201. A total recovery rate of oxygen is about 85%; the concentration of oxygen in the vacuum desorption gas of the first section is about 80%; the circulation time of the adsorption tower of each PSA section is generally 20-80 seconds; the vacuum degree of the first section is −0.095 MPa; and the air volume of the compressor, the superficial velocity of the adsorption towers of the each PSA section, the pumping volume of the vacuum pump, the amount of used adsorbent, the diameter of the adsorption tower and other design parameters are designed according to general conditions in the technical field of PSA.

Each adsorption tower in the present disclosure sequentially undergoes the following steps in one cycle.

PSA Drying Section (1) Adsorption A

Program-controlled valves KV1A-0 and KV2A-0 are opened; the raw air is boosted to 0.2 MPa (G) by an air compressor (C0100), and then enters into an activated alumina bed from the bottom of an adsorption tower T0100A, so that gaseous water in the air is adsorbed; and the unadsorbed and less easily adsorbed components such as oxygen, nitrogen and argon are discharged from an outlet, and then enter into the bottom of the adsorption tower of the first PSA section. With the passage of time, the total amount of gaseous water adsorbed by activated alumina is continuously increasing; when the gaseous water adsorbed by activated alumina is saturated, the air intake is stopped, and the adsorption is finished at this time; and a dew point of the gas mixture at the outlet of the PSA drying section in the step of adsorption A is controlled at about −50° C.

(2) Purging

After the adsorption of the adsorption tower T0100A is finished, program-controlled valves KV3A-0 and KV4A-0 are opened; an evacuated gas in the step of adsorption A of the adsorption tower of the first PSA section and an evacuated gas in the steps of backward discharge BD and purging P of the adsorption tower of the second PSA section enter into the adsorption tower from an outlet of the adsorption tower T0100A through the program-controlled valve KV3A-0, and then are discharged from the bottom of the adsorption tower T0100A through the program-controlled valve KV4A-0 and evacuated; and after the pathwise pressure release gas purging P is finished, the program-controlled valves KV3A-0 and KV4A-0 are closed.

After the above steps, the adsorption tower T0100A completes one cycle and is prepared for the raw gas adsorption again; and the operation of other adsorption towers in this PSA section are exactly the same as that of the adsorption tower T0100A, except that they are staggered operation.

Adsorption Tower of the First PSA Section:

(1) Adsorption A

A program-controlled valve KV1A-1 is opened, so that a gas mixture at the outlet of the PSA drying section in the step of adsorption A enters from the bottom of the adsorption tower T0101A to rise the pressure; when an adsorption pressure is reached, a program-controlled valve KV2A-1 is opened; an adsorbent in the adsorption tower selectively adsorbs carbon dioxide, oxygen etc. in the air; the unadsorbed oxygen, and less easily adsorbed components such as nitrogen and argon are discharged from an outlet by opening the program-controlled valve KV2A-1, to purge and regenerate activated alumina in the PSA drying section; with the passage of time, the total amount of carbon dioxide, oxygen etc. adsorbed by the adsorbent is continuously increasing; and when the concentration of oxygen at an outlet of the adsorption tower T0101A is 7-12% (V), the air intake is stopped, and the adsorption is finished.

(2) Pressure-Equalizing Drop ED

After the adsorption is finished, program-controlled valves KV3A-1 and KV3C-1 are opened; and a dead space gas in the adsorption tower T0101A will be discharged from the outlet of the adsorption tower and enter into the adsorption tower T0101C, which has completed the step of backward discharge BD in this section, to rise the pressure, so that the two towers have the same pressure as much as possible.

(3) Vacuumizing VC

After the pressure-equalizing drop ED of the adsorption tower T0101A is finished, a program-controlled valve KV4A-1 is opened and the gaseous water, carbon dioxide, oxygen and nitrogen absorbed by the adsorbent are pumped out from the bottom of the adsorption tower with a vacuum pump, and enter into a compressor buffer tank (V0201), so that the adsorbent is regenerated, and an oxygen-enriched intermediate gas is obtained at the same time. When no adsorption tower is vacuumized, a program-controlled valve KV12 is opened; and the vacuum pump is communicated with a vacuum buffer tank V0101.

(4) Pressure-Equalizing Rise ER

After the vacuumizing VC of the adsorption tower T0101A is finished, program-controlled valves KV3A-1 and KV3B-1 are opened; a gas discharged in the step of pressure-equalizing drop ED of an adsorption tower T0101B enters into the adsorption tower from the outlet of the adsorption tower T0101A, to rise the pressure of the adsorption tower T0101A, so that the adsorption towers T0101A and T0101B have the same pressure as much as possible. After the above steps, the adsorption tower T0101A completes one cycle and is prepared for the raw gas adsorption again; and the operation of other adsorption towers in this PSA section are exactly the same as that of the adsorption tower T0101A, except that they are staggered operation.

Second PSA Section (1) Adsorption A

A program-controlled valve KV1A-2 of the second PSA section is opened; the oxygen-enriched gas mixture pumped out in the step of vacuumizing (VC) of the adsorption tower of the first PSA section is fed into the compressor buffer tank (V0201), is compressed to 1.2 MPa by a rich oxygen compressor (C0201), and then enters into an adsorbent bed of an adsorption tower T0201A; an adsorbent in the adsorption tower T0201A selectively adsorbs carbon dioxide, nitrogen etc. in the oxygen-enriched gas mixture; the unadsorbed nitrogen, and less easily adsorbed components such as oxygen and argon flow out from the outlet and enter into the adsorption tower of the third PSA section so as to implement the step of adsorption by opening the program-controlled valve KV2A-2; with the passage of time, the total amount of carbon dioxide, nitrogen etc. adsorbed by the adsorbent is continuously increasing; and when carbon dioxide and nitrogen adsorbed by the adsorption tower T0201A is saturated, the air intake is stopped, and the adsorption is finished.

(2) Pressure-Equalizing Drop ED

After the adsorption A is finished, program-controlled valves KV3A-2 and KV3C-2 are opened; and a dead space gas in the adsorption tower T0201A will be discharged from the outlet of the adsorption tower and enter into the adsorption tower T0201C, which has completed the step of purging P in this section, to rise the pressure, so that the two towers have the same pressure as much as possible.

(3) Pathwise Pressure Release PP

After the pressure-equalizing drop ED is finished, the program-controlled valve KV3C-2 is closed, and a program-controlled valve KV23 is opened; a dead space gas in the adsorption tower T0201A will be discharged from an outlet of the adsorption tower and enter into a pathwise pressure release buffer tank (V0202); and when the pressure drops to 0.38-0.42 MPa (G), the program-controlled valves KV3A-2 and KV23 are closed, and the pathwise pressure release PP is finished.

(4) Backward Discharge BD

After the pathwise pressure release PP of the adsorption tower T0201A is finished, a program-controlled valve KV4A-2 is opened to reduce the pressure of the gas in the adsorption tower T0201A backwards, so that the gas is sent to the PSA drying section to purge and regenerate activated alumina.

(5) Pathwise Pressure Release Gas Purging P

After the backward discharge BD of the adsorption tower T0201A is finished, program-controlled valves KV3A-2 and KV23 are opened; a gas mixture in the pathwise pressure release buffer tank (V0202) enters into the adsorption tower from the outlet of the adsorption tower T0201A through the program-controlled valve KV3A-2, then is discharged from the bottom of the adsorption tower T0201A through the program-controlled valve KV4A-2, and is sent to the PSA drying section to purge and regenerate activated alumina; and after the pathwise pressure release gas purging P is finished, KV23 is closed.

(6) Pressure-Equalizing Rise ER

After the pathwise pressure release gas purging P of the adsorption tower T0201A is finished, program-controlled valves KV3A-2 and KV3B-2 are opened; a gas discharged in the step of pressure-equalizing drop ED of an adsorption tower T0201B enters into the adsorption tower from the outlet of the adsorption tower T0201A, to rise the pressure of the adsorption tower T0201A until the adsorption towers T0201A and T0201C have the same pressure.

(7) Final Pressure Rise FR

After the pressure-equalizing rise ER is finished, the program-controlled valve KV3A-2 is closed, and the program-controlled valve KV2A-2 is opened; and the outlet gas in the adsorption step is used for boosting the adsorption tower T0201A until the pressure is close to the adsorption pressure of the third PSA section.

After the above steps, the adsorption tower T0201A completes one cycle and is prepared for the raw gas adsorption again; and the operation of other adsorption towers in this PSA section are exactly the same as that of the adsorption tower T0201A, except that they are staggered operation.

The adsorption tower of the third PSA section sequentially undergoes the same steps and switching sequence of program-controlled valves in one cycle as that of the third PSA section in Example 11.

Results of the present Example show that the concentration of oxygen in the product is greater than or equal to 99.5% (V), the pressure is greater than or equal to 1.0 MPa, and the cost of using oxygen is 50% lower than that of bottled oxygen.

The invention claimed is:

1. A method for a mobile pressure swing adsorption oxygen production device, comprising a first pressure swing adsorption (PSA) section, a second PSA section and a third PSA section which are operated in series further comprising the following steps:
    a) passing dry raw air through a velocity-selective adsorbent bed in the first PSA section wherein most of oxygen is adsorbed by the velocity-selective adsorbent bed; most of nitrogen and argon are discharged from an outlet of an adsorption tower;
    b) desorbing an oxygen-enriched mixed gas from the first PSA section and sending into an adsorption tower of the second PSA section, which passes through a nitrogen balance-selective adsorbent bed; wherein most of nitrogen is adsorbed by the nitrogen balance-selective adsorbent bed;
    c) flowing oxygen, argon and a small amount of nitrogen from an outlet of the adsorption tower of the second PSA section, and directing into a nitrogen balance-selective adsorbent bed of an adsorption tower of the third PSA section wherein most of nitrogen is adsorbed and oxygen, argon and a small amount of nitrogen flow out from an outlet of the adsorption tower; and further wherein
    d) the adsorption tower of the first PSA section sequentially undergoes at least PSA steps of adsorption (A) and vacuumizing (VC) in one cycle; the adsorption tower of the second PSA section sequentially undergoes at least PSA steps of adsorption (A), pressure-equalizing drop (ED), backward discharge (BD) and pressure-equalizing rise (ER) in one cycle; and the adsorption tower of the third PSA section sequentially undergoes at least PSA steps of adsorption (A), pressure-equalizing drop (ED), backward discharge (BD) and pressure-equalizing rise (ER) in one cycle.

2. The method for the mobile PSA oxygen production device according to claim 1, wherein a step of pressure-equalizing drop (ED) is added to the adsorption tower of the first PSA section after the step of adsorption (A); and mean-while, a step of pressure-equalizing rise (ER) is added after the step of vacuumizing (VC).

3. The method for the mobile PSA oxygen production device according to claim 1, wherein a step of pathwise pressure release (PP) is added to the adsorption tower of the first PSA section after the step of adsorption (A).

4. The method for the mobile PSA oxygen production device according to claim 1, wherein a PSA step of final pressure rise (FR) is added to the adsorption tower of the second PSA section after the step of pressure-equalizing rise (ER).

5. The method for the mobile PSA oxygen production device according to claim 1, wherein a PSA step of final pressure rise (FR) is added to the adsorption tower of the third PSA section after the step of pressure-equalizing rise (ER).

6. The method for the mobile PSA oxygen production device according to claim 1, wherein a PSA step of desorption gas purging (P3) of the third PSA section is added to the adsorption tower of the second PSA section after the step of backward discharge (BD).

7. The method for the mobile PSA oxygen production device according to claim 6, wherein a PSA step of desorption gas pressure rise (R3) of the third PSA section is added to the adsorption tower of the second PSA section after the step of desorption gas purging (P3) of the third PSA section.

8. The method for the mobile PSA oxygen production device according to claim 1, wherein a step of pathwise pressure release (PP) is added to the adsorption tower of the second PSA section after the step of pressure-equalizing drop (ED); and meanwhile, a step of purging (P) is added after the step of backward discharge (BD).

9. The method for the mobile PSA oxygen production device according to claim 1, wherein a step of pathwise pressure release (PP) is added to the adsorption tower of the third PSA section after the step of pressure-equalizing drop (ED); and meanwhile, a step of purging (P) is added after the step of backward discharge (BD).

10. The method for the mobile PSA oxygen production device according to claim 8, wherein a PSA step of desorption gas pressure rise (R3) of the third PSA section is added to the adsorption tower of the second PSA section after the step of purging (P).

11. The method for the mobile PSA oxygen production device according to claim 1, wherein all or part of the desorption gas in the adsorption tower of the third PSA section is returned to be mixed with the oxygen-enriched desorption gas of the first PSA section, so as to flow into the second PSA section.

12. The method for the mobile PSA oxygen production device according to claim 1, wherein a PSA step of vacuumizing (VC) is added to the adsorption tower of the second PSA section after the step of backward discharge (BD).

13. The method for the mobile PSA oxygen production device according to claim 1, wherein a PSA step of vacuumizing (VC) is added to the adsorption tower of the third PSA section after the step of backward discharge (BD).

14. The method for the mobile PSA oxygen production device according to claim 1, wherein the adsorption tower of the first PSA section has a pressure of 0.15-0.22 MPa (gauge pressure) in the step of adsorption (A); and the adsorption towers of the second PSA section and the third PSA section have a pressure of 0.8-1.2 MPa (gauge pressure) in the step of adsorption (A).

15. The method for the mobile PSA oxygen production device according to claim 1, wherein the concentration of oxygen in outlet gas is 3-12% (V) at the end of the step of adsorption (A) in the adsorption tower of the first PSA section.

16. The method for the mobile PSA oxygen production device according to claim 1, wherein the concentration of oxygen in the outlet gas is 85-96% (V) at the end of the step of adsorption step (A) in the adsorption tower of the second PSA section.

17. The method for the mobile PSA oxygen production device according to claim 1, wherein the adsorption towers of the first PSA section and the second PSA section are charged with the desiccant beds at lower parts; raw air enters into a desiccant bed and a velocity-selective adsorbent bed from the bottom of an adsorption tower of a first PSA section; most of gaseous water in the raw air is adsorbed by the desiccant bed; most of oxygen is adsorbed by the velocity-selective adsorbent bed; most of nitrogen and argon are discharged from an outlet of the adsorption tower; the desorption gaseous water and oxygen-enriched gas enter into the desiccant bed and the nitrogen balance-selective adsorbent bed from the bottom of an adsorption tower of a second PSA section; most of the gaseous water in the oxygen-enriched gas is adsorbed by the desiccant bed; most of nitrogen is adsorbed by the nitrogen balance-selective adsorbent bed; oxygen, argon and a small amount of nitrogen flow out from an outlet of the adsorption tower, and then enter into the nitrogen balance-selective adsorbent bed from the bottom of an adsorption tower of a third PSA section; most of nitrogen is adsorbed; and oxygen, argon and a small amount of nitrogen flow out from an outlet of the adsorption tower.

18. The method for the mobile PSA oxygen production device according to claim 1, wherein the adsorption tower of the first PSA section is charged with activated alumina as a desiccant at a lower part, and charged with carbon molecular sieves as a velocity-selective adsorbent at an upper part; the adsorption tower of the second PSA section is charged with activated alumina as a desiccant at a lower part, and charged with 5A molecular sieves or X-type lithium molecular sieves as nitrogen balance-selective adsorbents at an upper part; and the adsorption tower of the third PSA section is charged with 5A molecular sieves or X-type lithium molecular sieves as nitrogen balance-selective adsorbents.

19. The method for the mobile PSA oxygen production device according to claim 1, wherein before the first PSA section, a PSA drying section is added to remove gaseous water from the air, so that the air which enters the first PSA section meets moisture requirements of the velocity-selective adsorbent bed; the PSA drying section sequentially undergoes two PSA steps of adsorption (A) and purging (P) in one cycle; and a gas in the step of purging (P) comes from the evacuated gas at the outlet in the step of adsorption (A) of the adsorption tower of the first PSA section and the evacuated gas desorbed by the adsorption tower of the second PSA section.

20. The method for the mobile PSA oxygen production device according to claim 19, wherein the drying section is charged with activated alumina as the desiccant; the adsorption tower of the first PSA section is charged with carbon molecular sieves as the velocity-selective adsorbent; the adsorption tower of the second PSA section is charged with 5A molecular sieves or X-type lithium molecular sieves as the nitrogen balance-selective adsorbents; and the adsorption tower of the third PSA section is charged with 5A molecular sieves or X-type lithium molecular sieves as the nitrogen balance-selective adsorbents.

* * * * *